United States Patent
Hansen

(10) Patent No.: US 10,567,419 B2
(45) Date of Patent: Feb. 18, 2020

(54) ASYMMETRICAL CHALLENGES FOR WEB SECURITY

(71) Applicant: Shape Security, Inc., Palo Alto, CA (US)

(72) Inventor: Marc R. Hansen, Mountain View, CA (US)

(*) Notice: Subject to any disclaimer, the term of this patent is extended or adjusted under 35 U.S.C. 154(b) by 149 days.

(21) Appl. No.: 15/202,755

(22) Filed: Jul. 6, 2016

(65) Prior Publication Data

US 2017/0013012 A1    Jan. 12, 2017

Related U.S. Application Data

(60) Provisional application No. 62/189,189, filed on Jul. 6, 2015.

(51) Int. Cl.
*H04L 29/06* (2006.01)
*G06F 21/31* (2013.01)

(52) U.S. Cl.
CPC ...... *H04L 63/1441* (2013.01); *H04L 63/1408* (2013.01); *H04L 67/42* (2013.01)

(58) Field of Classification Search
CPC . H04L 63/1441; H04L 63/1408; H04L 67/42; G06F 2221/2103; G06F 21/31;
(Continued)

(56) References Cited

U.S. PATENT DOCUMENTS 5,509,076 A    4/1996 Sprunk
5,974,549 A    10/1999 Golan
(Continued)

FOREIGN PATENT DOCUMENTS

CN    101471818    5/2011
WO    WO 2000/072119    11/2000
(Continued)

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: URL:http://web.archive.org/web/20130623080604/http://weis2012.econinfosec.org/papers/Anderson_WEIS2012.pdf>, 31 pages, Jun. 2012.
(Continued)

*Primary Examiner* — Alexander Lagor
*Assistant Examiner* — Vu V Tran
(74) *Attorney, Agent, or Firm* — Wei & Sleman LLP

(57) ABSTRACT

This document describes, among other things, a computer-implemented method for improving the security of one or more computing systems. The method can include receiving, at a computing system, first code that defines at least a portion of an electronic resource that is to be served to a client computing device. The method can include generating code that defines a challenge to be solved by the client computing device, in which the code is arranged to cause the client computing device to determine values for one or more parameters that comprise a solution to the challenge, and the values for the one or more parameters that comprise the solution to the challenge may be required for the client computing device to make valid requests to initiate one or more web-based transactions. The computing system can determine whether particular values for the parameters comprise a valid solution to the challenge.

38 Claims, 8 Drawing Sheets

(58) Field of Classification Search
CPC ........... G06Q 20/382; G06Q 20/40975; G06Q 20/388; H04W 12/12; H04W 12/1206
See application file for complete search history.

(56) References Cited

U.S. PATENT DOCUMENTS

| | | |
|---|---|---|
| 6,606,663 B1 | 8/2003 | Liao |
| 6,654,707 B2 | 11/2003 | Wynn |
| 6,938,170 B1 | 8/2005 | Kraft |
| 7,058,699 B1 | 6/2006 | Chiou |
| 7,107,347 B1 | 9/2006 | Cohen |
| 7,117,429 B2 | 10/2006 | Vedullapalli |
| 7,174,565 B2 | 2/2007 | Kadyk et al. |
| 7,180,895 B2 | 2/2007 | Smith |
| 7,334,254 B1 | 2/2008 | Boydstun |
| 7,398,553 B1 | 7/2008 | Li |
| 7,424,720 B2 | 9/2008 | Chagoly |
| 7,464,326 B2 | 12/2008 | Kawai |
| 7,472,413 B1 | 12/2008 | Mowshowitz |
| 7,475,341 B2 | 1/2009 | Malik |
| 7,480,385 B2 | 1/2009 | Weber |
| 7,500,099 B1 | 3/2009 | McElwee |
| 7,694,335 B1* | 4/2010 | Turner ............... H04L 63/1441 708/250 |
| 7,707,223 B2 | 4/2010 | Zubenko |
| 7,797,421 B1 | 9/2010 | Scofield |
| 7,836,425 B2 | 11/2010 | Rubin et al. |
| 7,849,502 B1 | 12/2010 | Bloch et al. |
| 7,870,610 B1 | 1/2011 | Mitchell |
| 7,895,653 B2 | 2/2011 | Calo |
| 8,020,193 B2 | 9/2011 | Bhola |
| 8,086,756 B2 | 12/2011 | Kamyshenko |
| 8,086,957 B2 | 12/2011 | Bauchot |
| 8,170,020 B2 | 5/2012 | Frank |
| 8,181,104 B1 | 5/2012 | Helfand |
| 8,195,953 B1 | 6/2012 | Yue |
| 8,200,958 B2 | 6/2012 | Coppola |
| 8,225,401 B2 | 7/2012 | Sobel |
| 8,266,202 B1 | 9/2012 | Colton |
| 8,332,952 B2 | 12/2012 | Zhang |
| 8,453,126 B1 | 5/2013 | Ganelin |
| 8,527,774 B2 | 9/2013 | Fallows |
| 8,533,480 B2 | 9/2013 | Pravetz |
| 8,555,388 B1 | 10/2013 | Wang |
| 8,561,193 B1 | 10/2013 | Srivastava |
| 8,578,499 B1 | 11/2013 | Zhu |
| 8,589,405 B1 | 11/2013 | Estan |
| 8,615,804 B2 | 12/2013 | Mui |
| 8,621,197 B2 | 12/2013 | Suryanarayana |
| 8,627,479 B2 | 1/2014 | Wittenstein |
| 8,650,648 B2 | 2/2014 | Howard et al. |
| 8,677,481 B1 | 3/2014 | Lee |
| 8,689,330 B2 | 4/2014 | Sinn |
| 8,713,631 B1 | 4/2014 | Pavlyushchik |
| 8,713,684 B2 | 4/2014 | Bettini |
| 8,726,394 B2 | 5/2014 | Maor |
| 8,739,284 B1 | 5/2014 | Gardner |
| 8,752,208 B2 | 6/2014 | Shulman |
| 8,762,962 B2 | 6/2014 | Ben-Artzi |
| 8,843,820 B1 | 9/2014 | Kay |
| 8,849,985 B1 | 9/2014 | Colton |
| 8,869,281 B2 | 10/2014 | Call |
| 8,954,583 B1 | 2/2015 | Zhou |
| 8,997,226 B1 | 3/2015 | Call |
| 9,043,924 B2 | 5/2015 | Maor |
| 9,158,893 B2 | 10/2015 | Call |
| 9,225,729 B1 | 12/2015 | Moen |
| 9,225,737 B2 | 12/2015 | Call |
| 9,241,004 B1 | 1/2016 | April |
| 9,258,328 B2 | 2/2016 | Ibatullin et al. |
| 9,338,143 B2 | 5/2016 | Hansen |
| 9,356,954 B2 | 5/2016 | Zhou |
| 9,456,050 B1 | 9/2016 | Lepeska |
| 9,537,888 B1 | 1/2017 | McClintock |
| 9,609,006 B2 | 3/2017 | Call |
| 9,628,498 B1 | 4/2017 | Aziz |
| 9,639,699 B1 | 5/2017 | Kurupati |
| 9,646,140 B2 | 5/2017 | Horadan |
| 9,680,850 B2 | 6/2017 | Rapaport |
| 9,686,300 B1 | 6/2017 | Kurupati |
| 9,705,902 B1 | 7/2017 | Call |
| 9,712,561 B2 | 7/2017 | Zhou |
| 9,906,544 B1 | 2/2018 | Kurupati |
| 10,165,004 B1 | 12/2018 | Mehta |
| 10,225,255 B1 | 3/2019 | Jampani |
| 2002/0099827 A1 | 7/2002 | Shah |
| 2002/0199116 A1 | 12/2002 | Hoene |
| 2004/0088651 A1 | 5/2004 | McKnight |
| 2004/0162994 A1 | 8/2004 | Cohen |
| 2005/0108554 A1 | 5/2005 | Rubin |
| 2005/0108562 A1 | 5/2005 | Khazan |
| 2005/0114705 A1 | 5/2005 | Reshef |
| 2005/0172338 A1 | 8/2005 | Sandu |
| 2005/0182958 A1 | 8/2005 | Pham |
| 2005/0198099 A1 | 9/2005 | Motsinger |
| 2005/0216770 A1 | 9/2005 | Rowett |
| 2005/0240999 A1 | 10/2005 | Rubin |
| 2005/0251536 A1 | 11/2005 | Harik |
| 2005/0278626 A1 | 12/2005 | Malik |
| 2006/0036870 A1 | 2/2006 | Dasari |
| 2006/0053295 A1 | 3/2006 | Madhusudan |
| 2006/0101047 A1 | 5/2006 | Rice |
| 2006/0155869 A1 | 7/2006 | Nanduri |
| 2006/0165060 A1* | 7/2006 | Dua ..................... G06Q 20/20 370/352 |
| 2006/0174323 A1 | 8/2006 | Brown |
| 2006/0195588 A1 | 8/2006 | Pennington |
| 2006/0230288 A1 | 10/2006 | Fox |
| 2006/0282897 A1 | 12/2006 | Sima |
| 2006/0288418 A1 | 12/2006 | Yang |
| 2007/0011295 A1 | 1/2007 | Hansen |
| 2007/0064617 A1 | 3/2007 | Reves |
| 2007/0074227 A1 | 3/2007 | Naidu |
| 2007/0088955 A1 | 4/2007 | Lee |
| 2007/0118669 A1 | 5/2007 | Rand |
| 2007/0234070 A1 | 10/2007 | Horning |
| 2008/0130940 A1 | 6/2008 | Whitelaw |
| 2008/0183902 A1 | 7/2008 | Cooper |
| 2008/0208785 A1 | 8/2008 | Trefler |
| 2008/0222736 A1 | 9/2008 | Boodaei |
| 2008/0320567 A1 | 12/2008 | Shulman |
| 2009/0070459 A1 | 3/2009 | Cho |
| 2009/0099988 A1 | 4/2009 | Stokes |
| 2009/0144829 A1 | 6/2009 | Grigsby |
| 2009/0193513 A1 | 7/2009 | Agarwal |
| 2009/0199297 A1 | 8/2009 | Jarrett |
| 2009/0241174 A1 | 9/2009 | Rajan |
| 2009/0249310 A1 | 10/2009 | Meijer et al. |
| 2009/0292791 A1 | 11/2009 | Livshits |
| 2009/0292984 A1 | 11/2009 | Bauchot |
| 2009/0327138 A1* | 12/2009 | Mardani ............... G06Q 20/10 705/64 |
| 2010/0088404 A1 | 4/2010 | Mani |
| 2010/0100927 A1 | 4/2010 | Bhola |
| 2010/0106611 A1 | 4/2010 | Paulsen |
| 2010/0142382 A1 | 6/2010 | Jungck et al. |
| 2010/0186089 A1 | 7/2010 | Fu |
| 2010/0191962 A1 | 7/2010 | Yan |
| 2010/0218253 A1 | 8/2010 | Andrew |
| 2010/0235637 A1 | 9/2010 | Lu |
| 2010/0235910 A1 | 9/2010 | Ku |
| 2010/0257354 A1 | 10/2010 | Johnston |
| 2010/0287132 A1 | 11/2010 | Hauser |
| 2011/0022846 A1 | 1/2011 | Ginter et al. |
| 2011/0035733 A1 | 2/2011 | Horning |
| 2011/0047169 A1 | 2/2011 | Leighton et al. |
| 2011/0107077 A1 | 5/2011 | Henderson |
| 2011/0131416 A1 | 6/2011 | Schneider |
| 2011/0154308 A1 | 6/2011 | Lobo |
| 2011/0225234 A1 | 9/2011 | Amit |
| 2011/0231305 A1 | 9/2011 | Winters |
| 2011/0239113 A1 | 9/2011 | Hung |
| 2011/0255689 A1 | 10/2011 | Bolotov |
| 2011/0296391 A1 | 12/2011 | Gass et al. |

(56) References Cited

U.S. PATENT DOCUMENTS

| | | |
|---|---|---|
| 2011/0307954 A1 | 12/2011 | Melnik |
| 2011/0314091 A1 | 12/2011 | Podjarny |
| 2011/0320816 A1 | 12/2011 | Yao |
| 2012/0022942 A1 | 1/2012 | Holloway et al. |
| 2012/0036576 A1 | 2/2012 | Iyer |
| 2012/0090030 A1 | 4/2012 | Rapaport |
| 2012/0096116 A1 | 4/2012 | Mislove et al. |
| 2012/0117649 A1 | 5/2012 | Holloway et al. |
| 2012/0124372 A1* | 5/2012 | Dilley .............. H04L 67/2819 713/162 |
| 2012/0198528 A1 | 8/2012 | Baumhof |
| 2012/0216251 A1 | 8/2012 | Kumar |
| 2012/0254727 A1 | 10/2012 | Jain |
| 2012/0255006 A1 | 10/2012 | Aly et al. |
| 2012/0311715 A1 | 12/2012 | Tal |
| 2012/0324236 A1 | 12/2012 | Srivastava |
| 2013/0047255 A1 | 2/2013 | Dalcher |
| 2013/0055287 A1 | 2/2013 | Pope |
| 2013/0061055 A1 | 3/2013 | Schibuk |
| 2013/0086679 A1 | 4/2013 | Beiter |
| 2013/0091425 A1 | 4/2013 | Hughes |
| 2013/0091582 A1 | 4/2013 | Kellerman |
| 2013/0173782 A1 | 7/2013 | Ragutski |
| 2013/0198607 A1 | 8/2013 | Woods |
| 2013/0205370 A1* | 8/2013 | Kalgi .............. H04W 12/10 726/3 |
| 2013/0219256 A1 | 8/2013 | Lloyd |
| 2013/0219492 A1 | 8/2013 | Call |
| 2013/0227397 A1 | 8/2013 | Tvorun |
| 2013/0232234 A1 | 9/2013 | Kapur et al. |
| 2013/0263264 A1 | 10/2013 | Klein |
| 2013/0273882 A1 | 10/2013 | Walsh |
| 2013/0311863 A1 | 11/2013 | Gutkin |
| 2013/0340043 A1 | 12/2013 | Zarei |
| 2014/0040051 A1 | 2/2014 | Ovick |
| 2014/0040787 A1 | 2/2014 | Mills |
| 2014/0053059 A1 | 2/2014 | Weber |
| 2014/0074662 A1 | 3/2014 | Dierks |
| 2014/0089786 A1 | 3/2014 | Hashmi |
| 2014/0096194 A1 | 4/2014 | Bhogavilli |
| 2014/0189808 A1 | 7/2014 | Mahaffey |
| 2014/0208198 A1 | 7/2014 | Ayoub |
| 2014/0250514 A1 | 9/2014 | Blomquist |
| 2014/0259145 A1* | 9/2014 | Khandelwal ........ H04L 63/1458 726/13 |
| 2014/0282872 A1 | 9/2014 | Hansen et al. |
| 2014/0282891 A1 | 9/2014 | Frechette |
| 2014/0283069 A1 | 9/2014 | Call |
| 2014/0298469 A1 | 10/2014 | Marion |
| 2014/0304816 A1 | 10/2014 | Klein |
| 2014/0310392 A1 | 10/2014 | Ho |
| 2014/0359571 A1 | 12/2014 | Sasikumar |
| 2015/0026766 A1 | 1/2015 | Holloway et al. |
| 2015/0058992 A1 | 2/2015 | El-Moussa |
| 2015/0067031 A1 | 3/2015 | Acharya |
| 2015/0067866 A1 | 3/2015 | Ibatullin |
| 2015/0096020 A1* | 4/2015 | Adams ............... H04L 63/1458 726/23 |
| 2015/0112892 A1 | 4/2015 | Kaminsky |
| 2015/0134956 A1 | 5/2015 | Stachura |
| 2015/0163201 A1 | 6/2015 | Call |
| 2015/0256556 A1 | 9/2015 | Kaminsky |
| 2015/0262183 A1 | 9/2015 | Gervais |
| 2015/0278491 A1 | 10/2015 | Horning |
| 2015/0281263 A1 | 10/2015 | McLaughlin |
| 2015/0358338 A1 | 12/2015 | Zeitlin |
| 2015/0379266 A1 | 12/2015 | McLaughlin |
| 2016/0005029 A1 | 1/2016 | Ivey |
| 2016/0072829 A1 | 3/2016 | Call |
| 2016/0080355 A1* | 3/2016 | Greenspan ............. G06F 21/51 726/7 |
| 2016/0119344 A1 | 4/2016 | Freitas Fortuna dos Santos |
| 2016/0147992 A1 | 5/2016 | Zhao |
| 2016/0342793 A1 | 11/2016 | Hidayat |
| 2016/0344769 A1 | 11/2016 | Li |
| 2016/0378989 A1 | 12/2016 | Park |
| 2017/0012960 A1 | 1/2017 | Idika |
| 2017/0013012 A1 | 1/2017 | Hansen |
| 2017/0048260 A1 | 2/2017 | Peddemors |
| 2017/0178178 A1 | 6/2017 | Zhang |
| 2017/0201540 A1 | 7/2017 | Call |
| 2017/0235954 A1 | 8/2017 | Kurupati |
| 2017/0237766 A1 | 8/2017 | Mattson |
| 2017/0257383 A1 | 9/2017 | Ficarra |
| 2017/0257385 A1 | 9/2017 | Overson |
| 2017/0293748 A1 | 10/2017 | Kurupati |
| 2018/0041527 A1 | 2/2018 | Call |
| 2018/0048671 A1 | 2/2018 | Shekyan |
| 2018/0205747 A1 | 7/2018 | Ficarra |
| 2018/0212993 A1 | 7/2018 | Call |
| 2018/0227325 A1 | 8/2018 | Zhou |
| 2018/0255154 A1 | 9/2018 | Li |
| 2018/0270256 A1 | 9/2018 | Call |
| 2019/0081977 A1 | 3/2019 | Yang |
| 2019/0141064 A1 | 5/2019 | Call |
| 2019/0182251 A1 | 6/2019 | Jampani |
| 2019/0327265 A1 | 10/2019 | Zhao |
| 2019/0364019 A1 | 11/2019 | Yang |
| 2019/0373012 A1 | 12/2019 | Mattson |

FOREIGN PATENT DOCUMENTS

| | | |
|---|---|---|
| WO | WO2000/72119 | 11/2000 |
| WO | WO 2002/093369 | 11/2002 |
| WO | WO2002/093369 | 11/2002 |
| WO | WO 2008/095018 | 8/2008 |
| WO | WO2008/095018 | 8/2008 |
| WO | WO 2008/095031 | 8/2008 |
| WO | WO2008/095031 | 8/2008 |
| WO | WO 2008/130946 | 10/2008 |
| WO | WO2008/130946 | 10/2008 |
| WO | WO 2013/091709 | 6/2013 |
| WO | WO 2017/007705 | 1/2017 |
| WO | WO 2017/007936 | 1/2017 |
| WO | WO 2017/074622 | 5/2017 |

OTHER PUBLICATIONS

Boston University Information Services & Technology [online]. "Understanding Authentication, Authorization, and Encryption," published before Jul. 1, 2014, [Retrieved only Jul. 1, 2014]. Retrieved from Internet: <URL: http://www.bu.edu/tech/services/security/resources/bestpractice/auth/>. 4 pages.

Cova et al., "Detection and Analysis of Drive-by-Download Attacks and Malicious JavaScript Code," World Wide Web Conference Committee, Apr. 26-30, 2010. Retrieved from the Internet <URL: http://www.cs.ucsb.edu/~vigna/publications/2010_cova_kruegel_vigna_Wepawet.pdf>, 10 pages.

Currie et al., "In-the-wire authentication: Protecting client-side critical data fields in secure network transactions," 2nd International Conference on Adaptive Science and Technology, 2009, pp. 232-237.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclagb.tuwien.ac.at/papers /driveby.pdf>, 19 pages, 2009.

Entrust, "Defeating Man-in the Browser Malware," Entrust.com [online] Sep. 2012 [retrieved Oct. 15, 2013]. Retrieved from the Internet: <URL: http://download.entrust.com/resources/download.cfm/24002/>, 18 pages.

Hofmeyr, Forrest, Somayaji; Intrusion Detection using Sequence of System calls, Journal of Computer Security 6 (1998).

International Search Report and Written Opinion in International Application No. PCT/US2016/040645, dated Sep. 22, 2016, 14 pages.

Indiana University [online]. "Authentication vs. Authorization," published before Jul. 1, 2014, [Retrieved on Jul. 1, 2014]. Retrieved from Internet: <URL: https://protect.iu.edu/cybersecurity/authn-authz>. 3 pages.

(56) References Cited

OTHER PUBLICATIONS

Krebs on Security, In-depth security news and investigation, "A Closer Look at Rapport from Trusteer", dated Apr. 29, 2010.

Marcus and Sherstobitoff, "Dissecting Operation High Roller,"McAfee [online] 2012 [retrieved on Oct. 15, 2013]. Retrieved from the Internet <URL: http//www.mcafee.com/us/resources/reports/rpoperations-high-roller.pdf>, 20 pages.

Matsunaka, T.; Urakawa, J.; Kubota, A., "Detecting and Preventing Drive-By Download Attack via Participative Monitoring of the Web," in Information Security (Asia JCIS), 2013 Eighth Asia Joint Conference on Information Security, pp. 48-55. doi: 10.1109/ASIAJCIS.2013.15.

Oh, "Recent Java exploitation trends and malware," Black Hat USA 2012, Retrieved from the Internet; <URL: https://media.blackhat.com/bh-us-12/Briefings/Oh/GBH_US_12_Oh_Recent_Java_Exploitation_Trends-and_MalwareWP.pdf>, 27 pages.

Pattabiraman and Zorn, "DoDOM: Leveraging DOM Invariants for Web 2.0 Application Robustness Testing," 2010 IEEE 21st International Symposium on Software Reliability Engineering, pp. 191-200.

Rieck et al. "Cujo: Efficient Detection and Prevention of Drive-by-Download Attacks," ACSAC 2010, Austin, Texas, Dec. 6-10, 9 pages.

Shackleford, "Application Whitelisting: Enhancing Host Security," SANS Institute Reading Room, Oct. 2009, 16 pages.

Sirer et al; ACM SIGOPS Operating Systems 1999, "Design and Implementation of a Distributed Virtual Machine for Networked Computers".

Wikipedia [online]. "MD5," Jun. 30, 2014, [Retrieved on Jul. 1, 2014]. Retrieved from Internet: <URL: https://en.wikipedia.org/w/index.php?title=MD5&oldid=615031889>. 12 pages.

NOA, mailed on Feb. 16, 2017, re: Justin D. Call, U.S. Appl. No. 14/822,287, filed Aug. 10, 2015.

NOA, mailed on Feb. 21, 2017, re: Shekyan et al., U.S. Appl. No. 14/502,893, filed Sep. 30, 2014.

NOA, mailed on Mar. 2, 2017, re: Justin D. Call, U.S. Appl. No. 14/930,198, filed Nov. 2, 2015.

NOA, mailed on Mar. 10, 2017, re: Roger S. Hoover, U.S. Appl. No. 14/470,082, filed Aug. 27, 2014.

CTNF, mailed on Mar. 9, 2017, re: Siying Yang, U.S. Appl. No. 14/925,547, filed Oct. 28, 2015.

NOA, mailed on Apr. 23, 2015, re: Justin Call, U.S. Appl. No. 13/527,025, filed Jun. 19, 2012.

CTFR, mailed on Feb. 10, 2015, re: Justin Call, U.S. Appl. No. 13/527,025, filed Jun. 19, 2012.

CTNF, mailed on Nov. 2, 2012, re: Justin Call, U.S. Appl. No. 13/527,025, filed Jun. 19, 2012.

CTFR, mailed on Apr. 23, 2013, re: Justin Call, U.S. Appl. No. 13/527,025, filed Jun. 19, 2012.

CTNF, mailed on Aug. 4, 2014, re: Justin Call, U.S. Appl. No. 13/527,025, filed Jun. 19, 2012.

NOA, mailed on Jun. 1, 2015, re: Justin Call, U.S. Appl. No. 14/527,025, filed Jun. 19, 2012.

CTNF, mailed on Feb. 26, 2015, re: Justin Call, U.S. Appl. No. 14/055,576, filed Oct. 16, 2013.

NOA, mailed on Aug. 21, 2015, re: Justin Call, U.S. Appl. No. 14/055,576, filed Oct. 16, 2013.

CTNF, mailed on Dec. 24, 2014, re: Justin Call, U.S. Appl. No. 14/055,583, filed Oct. 16, 2013.

NOA, mailed on Jun. 19, 2015, re: Justin Call, U.S. Appl. No. 14/055,583, filed Oct. 16, 2013.

CTNF, mailed on Dec. 24, 2013, re: Justin Call, U.S. Appl. No. 14/055,646, filed Oct. 16, 2013.

CTFR, mailed on May 27, 2014, re: Justin Call, U.S. Appl. No. 14/055,646, filed Oct. 16, 2013.

NOA, mailed on Aug. 12, 2014, re: Justin Call, U.S. Appl. No. 14/055,646, filed Oct. 16, 2013.

NOA, mailed on Sep. 4, 2014, re: Justin Call, U.S. Appl. No. 14/055,646, filed Oct. 16, 2013.

CTFR, mailed on Apr. 9, 2015, re: Justin Call, U.S. Appl. No. 14/055,704, filed Oct. 16, 2013.

CTNF, mailed on Dec. 4, 2014, re: Justin Call, U.S. Appl. No. 14/055,704, filed Oct. 16, 2013.

CTNF, mailed on Dec. 30, 2013, re: Justin Call, U.S. Appl. No. 14/055,704, filed Oct. 16, 2013.

CTFR, mailed on Apr. 22, 2014, re: Justin Call, U.S. Appl. No. 14/055,704, filed Oct. 16, 2013.

CTFR, mailed on Sep. 25, 2015, re: Marc Hansen, U.S. Appl. No. 14/055,714, filed Oct. 16, 2013.

CTNF, mailed on Mar. 16, 2015, re: Marc Hansen, U.S. Appl. No. 14/055,714, filed Oct. 16, 2013.

NOA, mailed on Jan. 13, 2016, re: Marc Hansen, U.S. Appl. No. 14/055,714, filed Oct. 16, 2013.

CTNF, mailed on May 20, 2015, re: Justin Call, U.S. Appl. No. 14/110,659, filed Oct. 8, 2013.

NOA, mailed on Aug. 19, 2015, re: Daniel Moen, U.S. Appl. No. 14/160,107, filed Jan. 21, 2014.

CTNF, mailed on Jun. 27, 2014, re: Justin Call, U.S. Appl. No. 14/255,248, filed Apr. 17, 2014.

NOA, mailed on Nov. 19, 2014, re: Justin Call, U.S. Appl. No. 14/255,248, filed Apr. 17, 2014.

NOA, mailed on Dec. 24, 2014, re: Justin Call, U.S. Appl. No. 14/255,248, filed Apr. 17, 2014.

NOA, mailed on Aug. 24, 2015, re: Subramanian Varadarajan, U.S. Appl. No. 14/290,805, filed May 29, 2014.

CTFR, mailed on Jan. 14, 2015, re: Subramanian Varadarajan, U.S. Appl. No. 14/290,805, filed May 29, 2014.

CTNF, mailed on Sep. 5, 2014, re: Subramanian Varadarajan, U.S. Appl. No. 14/290,805, filed May 29, 2014.

CTFR, mailed on Dec. 30, 2014, re: Justin Call, U.S. Appl. No. 14/290,835, filed May 29, 2014.

CTNF, mailed on Jul. 30, 2014, re: Justin Call, U.S. Appl. No. 14/290,835, filed May 29, 2014.

NOA, mailed on Mar. 11, 2015, re: Justin Call, U.S. Appl. No. 14/290,835, filed May 29, 2014.

CTNF, mailed on Sep. 1, 2015, re: Ariya Hidayat, U.S. Appl. No. 14/293,895, filed Jun. 2, 2014.

NOA, mailed on Mar. 30, 2016, re: Ariya Hidayat, U.S. Appl. No. 14/293,895, filed Jun. 2, 2014.

CTNF, mailed on Jun. 24, 2016, re: Roger Hoover, U.S. Appl. No. 14/470,082, filed Aug. 27, 2014.

CTNF, mailed on Aug. 28, 2015, re: Roger Hoover, U.S. Appl. No. 14/470,082, filed Aug. 27, 2014.

NOA, mailed on Oct. 24, 2016, re: Sergey Shekyan, U.S. Appl. No. 14/502,893, filed Sep. 30, 2014.

CTNF, mailed on Apr. 20, 2016, re: Sergey Shekyan, U.S. Appl. No. 14/502,893, filed Sep. 30, 2014.

NOA, mailed on Jul. 21, 2016, re: Siying Yang, U.S. Appl. No. 14/541,062, filed Nov. 13, 2014.

CTNF, mailed on Feb. 23, 2016, re: Siying Yang, U.S. Appl. No. 14/541,062, filed Nov. 13, 2014.

CTNF, mailed on May 6, 2016, re: Yao Zhao, U.S. Appl. No. 14/552,331, filed Nov. 25, 2014.

NOA, mailed on Aug. 17, 2016, re: Yao Zhao, U.S. Appl. No. 14/552,331, filed Nov. 25, 2014.

CTNF, mailed on May 8, 2015, re: Timothy Peacock, U.S. Appl. No. 14/570,632, filed Dec. 15, 2014.

NOA, mailed on Dec. 18, 2015, re: Timothy Peacock, U.S. Appl. No. 14/570,632, filed Dec. 15, 2014.

CTNF, mailed on Mar. 17, 2016, re: Justin Call, U.S. Appl. No. 14/672,879, filed Mar. 30, 2015.

CTNF, mailed on Apr. 28, 2016, re: Ariya Hidayat, U.S. Appl. No. 14/673,669, filed Mar. 30, 2015.

NOA, mailed on Nov. 21, 2016, re: Ariya Hidayat, U.S. Appl. No. 14/673,669, filed Mar. 30, 2015.

NOA, mailed on Dec. 22, 2016, re: Ariya Hidayat, U.S. Appl. No. 14/673,669, filed Mar. 30, 2015.

NOA, mailed on Jan. 9, 2017, re: Ariya Hidayat, U.S. Appl. No. 14/673,669, filed Mar. 30, 2015.

CTNF, mailed on Nov. 10, 2016, re: Nwokedi Idika, U.S. Appl. No. 14/728,621, filed Jun. 2, 2015.

(56) References Cited

OTHER PUBLICATIONS

CTNF, mailed on Oct. 21, 2016, re: Justin Call, U.S. Appl. No. 14/738,913, filed Jun. 14, 2015.
NOA, mailed on Mar. 16, 2017, re: Justin Call, U.S. Appl. No. 14/738,913, filed Jun. 14, 2015.
CTNF, mailed on Jul. 18, 2016, re: Justin Call, U.S. Appl. No. 14/822,287, filed Aug. 10, 2015.
CTNF, mailed on Mar. 14, 2016, re: Justin Call, U.S. Appl. No. 14/874,717, filed Oct. 5, 2015.
NOA, mailed on Apr. 28, 2016, re: Justin Call, U.S. Appl. No. 14/874,717, filed Oct. 5, 2015.
CTFR, mailed on Aug. 12, 2016, re: Subramanian Varadarajan, U.S. Appl. No. 14/923,603, filed Oct. 27, 2015.
NOA, mailed on Dec. 1, 2016, re: Subramanian Varadarajan, U.S. Appl. No. 14/923,603, filed Oct. 27, 2015.
NOA, mailed on Nov. 9, 2016, re: Justin Call, U.S. Appl. No. 14/930,198, filed Nov. 2, 2015.
CTNF, mailed on Jul. 21, 2016, re: Justin Call, U.S. Appl. No. 14/930,198, filed Nov. 2, 2015.
NOA, mailed on Nov. 16, 2016, re: Justin Call, U.S. Appl. No. 14/980,409, filed Dec. 28, 2015.
CTNF, mailed on Aug. 2, 2016, re: Justin Call, U.S. Appl. No. 14/980,409, filed Dec. 28, 2015.
CTFR, mailed on Aug. 23, 2016, re: Siying Yang, U.S. Appl. No. 15/011,172, filed Jan. 29, 2016.
CTNF, mailed on Apr. 18, 2016, re: Siying Yang, U.S. Appl. No. 15/011,172, filed Jan. 29, 2016.
CTNF, mailed on Dec. 16, 2016, re: Marc Hansen, U.S. Appl. No. 15/148,139, filed May 6, 2016.
CTFR, mailed on Nov. 18, 2016, re: Justin D. Call, U.S. Appl. No. 14/672,879, filed Mar. 30, 2015.
CTNF, mailed on Jun. 1, 2017, re: Siying Yang, U.S. Appl. No. 14/942,769, filed Nov. 16, 2015.
NOA, mailed on Jun. 1, 2017, re: Sergey Shekyan, U.S. Appl. No. 14/502,893, filed Sep. 30, 2014.
NOA, mailed on Jun. 7, 2017, re: Call, et al., U.S. Appl. No. 14/930,198, filed Jun. 7, 2017.
CTNF, mailed on Apr. 4, 2017, re: Jarrod Overson, U.S. Appl. No. 15/069,667, filed Mar. 14, 2016.
CTNF, mailed on Jun. 2, 2017, re: Ariya Hidayat, U.S. Appl. No. 15/224,978, filed Aug. 1, 2016.
CTNF, mailed on Apr. 7, 2017, re: Yao Zhao, U.S. Appl. No. 14/861,906, filed Sep. 22, 2015.
CTNF, mailed on May 25, 2017, re: Daniel G. Moen, U.S. Appl. No. 14/980,231, filed Dec. 28, 2015.
NOA, mailed on Jun. 20, 2017, re: Roger S. Hoover, U.S. Appl. No. 14/470,082, filed Aug. 27, 2014.
CTNF, mailed on Jul. 26, 2017, re: Bei Zhang, U.S. Appl. No. 14/859,084, filed Sep. 18, 2015.
CTNF, mailed on Jun. 21, 2017, re: Zhiwei Li, U.S. Appl. No. 14/718,736, filed May 21, 2015.
CTFR, mailed on Aug. 14, 2017, re: Marc R. Hansen, U.S. Appl. No. 15/148,139, filed May 6, 2016.
CTNF, mailed on Aug. 30, 2017, re: Justin D. Call, U.S. Appl. No. 15/470,715, filed Mar. 27, 2017.
CTFR, mailed on Sep. 5, 2017, re: Siying Yang, U.S. Appl. No. 14/925,547, filed Oct. 28, 2015.
NOA, mailed on Oct. 11, 2017, re: James D. Call, U.S. Appl. No. 14/822,287, filed Aug. 10, 2015.
NOA, mailed on Oct. 18, 2017, re: Roger S. Hoover, U.S. Appl. No. 14/470,082, filed Aug. 27, 2014.
CTFR, mailed on Oct. 30, 2017, re: Jarrod Overson, U.S. Appl. No. 15/069,667, filed Mar. 14, 2016.
CTNF, mailed on Oct. 19, 2017, re: Jarrod S. Overson, U.S. Appl. No. 15/059,080, filed Mar. 2, 2016.
CTNF, mailed on Oct. 19, 2017, re: Wesley Hales, U.S. Appl. No. 15/011,237, filed Jan. 29, 2016.
NOA, mailed on Oct. 25, 2017, re: Michael J. Ficarra, U.S. Appl. No. 15/060,322, filed Mar. 3, 2016.
CTNF, mailed on Nov. 13, 2017, re: Nwokedi Idika, U.S. Appl. No. 15/728,596, filed Jun. 2, 2015.
CTNF, mailed on Dec. 13, 2017, re: Justin D. Call, U.S. Appl. No. 15/645,787, filed Jul. 10, 2017.
NOA, mailed on Dec. 18, 2017, re: Yao Zhao, U.S. Appl. No. 14/861,906, filed Sep. 22, 2015.
NOA, mailed on Jan. 5, 2018, re: Yao Zhao, U.S. Appl. No. 14/861,906, filed Sep. 22, 2015.
NOA, mailed on Jan. 9, 2018, re: Justin D. Call, U.S. Appl. No. 15/470,715, filed Mar. 27, 2017.
NOA, mailed on Jan. 16, 2018, re: Justin D. Call, U.S. Appl. No. 14/822,287, filed Aug. 10, 2015.
CTFR, mailed on Jan. 25, 2018, re: Siying Yang, U.S. Appl. No. 14/942,769, filed Nov. 16, 2015.
CTNF, mailed on Feb. 7, 2017, re: Daniel G. Moen, U.S. Appl. No. 14/980,231, filed Dec. 28, 2015.
CTFR, mailed on Jan. 10, 2018, re: Bei Zhang, U.S. Appl. No. 14/859,084, filed Sep. 18, 2015.
NOA, mailed on Jan. 25, 2018, re: Zhiwei Li, U.S. Appl. No. 14/718,736, filed May 21, 2015.
CTNF, mailed on Feb. 8, 2018, re: Xiaoming Zhou, U.S. Appl. No. 15/651,303, filed Jul. 17, 2017.
CTNF, mailed on Mar. 5, 2018, re: Justin D. Call, U.S. Appl. No. 15/785,309, filed Oct. 16, 2017.
NOA, mailed on Mar. 15, 2018, re: Sergey Shekyan, U.S. Appl. No. 15/791,291, filed Oct. 23, 2017.
CTFR, mailed on Feb. 23, 2018, re: Wesley Hayes, U.S. Appl. No. 15/011,237, filed Jan. 29, 2016.
CTNF, mailed on Mar. 30, 2018, re: Michael J. Ficarra, U.S. Appl. No. 15/060,380, filed Mar. 3, 2016.
CTNF, mailed on May 3, 2018, re: Marc R. Hansen, U.S. Appl. No. 15/148,139, filed May 6, 2016.
CTNF, mailed on Apr. 19, 2018, re: Michael J. Ficarra, U.S. Appl. No. 15/919,034, filed Mar. 12, 2018.
NOA, mailed on Apr. 30, 2018, re: Xiaoming Zhou, U.S. Appl. No. 15/651,303, filed Jul. 17, 2017.
CTNF, mailed on May 15, 2018, re: Marc R. Hansen, U.S. Appl. No. 15/202,755, filed Jul. 6, 2016.
CTFR, mailed on May 10, 2018, re: Nwokedi Idika, U.S. Appl. No. 14/728,596, filed Jun. 2, 2015.
CTNF, mailed on Feb. 16, 2018, re: Siying Yang, U.S. Appl. No. 15/068,468, filed Mar. 11, 2016.
NOA, mailed on May 18, 2018, re: Siying Yang, U.S. Appl. No. 14/942,769, filed Nov. 16, 2015.
CTNF, mailed on May 23, 2018, re: Jarrod Overson, U.S. Appl. No. 15/069,667, filed Mar. 14, 2016.
CTNF, mailed on May 23, 2018, re: Bei Zhang, U.S. Appl. No. 14/859,084, filed Sep. 18, 2015.
CTFR, mailed on May 17, 2018, re: Jarrod S. Overson, U.S. Appl. No. 15/059,080, filed Mar. 2, 2016.
NOA, mailed on May 14, 2018, re: Xiaoming Zhou, U.S. Appl. No. 15/651,303, filed Jul. 17, 2017.
CTNF, mailed on Jun. 7, 2018, re: Siying Yang, U.S. Appl. No. 14/925,547, filed Oct. 28, 2015.
EP App. No. 14730229.3, Intention to Grant, EP, Call et al., dated May 23, 2017.
Measuring the Cost of Cybercrime, Workshop on the Economics of Information Security (WEIS), Jul. 26, 2012.
Understanding Authentication, Authorization, and Encryption, , Jul. 1, 2014.
Detection and Analysis of Drive-by-Download Attacks and Malicious JavaScript Code, Apr. 26, 2010.
In-the-wire authentication: Protecting client-side critical data fields in secure network transactions, Jan. 14, 2009.
Defending Browsers against Drive-by Downloads: Mitigating Heap-spraying Code Injection Attacks, Jul. 9, 2009.
Defeating Man-in the Browser Malware, Sep. 1, 2012.
Intrusion Detection using Sequences of System calls, Aug. 18, 1998.
Authentication vs. Authorization.
A Closer Look at Rapport from Trusteer, Apr. 29, 2010.
Dissecting Operation High Roller.
Detecting and Preventing Drive-By Download Attack via Participative Monitoring of the Web, Jul. 23, 2013.

(56) References Cited

OTHER PUBLICATIONS

Recent Java exploitation trends and malware, Jul. 26, 2012.
DoDOM: Leveraging DOM Invariants for Web 2.0 Application Robustness Testing, Nov. 1, 2010.
Cujo: Efficient Detection and Prevention of Drive-by-Download Attacks, Dec. 6, 2010.
Application Whitelisting: Enhancing Host Security, Oct. 1, 2009.
Examination Report No. 1 for Standard Patent Application, App. No. 2014237025, AU, Call, Justin D, dated Sep. 25, 2014.
Design and Implementation of a Distributed Virtual Machine for Networked Computers, 1999.
MD5, Jun. 30, 2014.
International Search Report, dated Apr. 22, 2016, PCT/US16/18081.
International Search Report, dated Jan. 19, 2016, PCT/US15/49024.
International Search Report, dated Dec. 22, 2015, PCT/US15/52030.
International Search Report, dated Aug. 25, 2015, PCT/US15/32060.
International Search Report, dated Jan. 21, 2015, PCT/US14/23635.
International Search Report, dated Sep. 22, 2016, PCT/US16/40645.
International Search Report, dated Feb. 16, 2017, PCT/US16/53472.
International Search Report, dated Oct. 11, 2016, PCT/US16/41337.
International Search Report, dated Jul. 1, 2016, PCT/US16/25092.
International Search Report, dated Apr. 7, 2016, PCT/US15/62206.
International Search Report, dated Aug. 14, 2014, PCT/US14/27805.
International Search Report, dated Aug. 1, 2014, PCT/US14/24232.
International Search Report, dated Jul. 18, 2014, PCT/US14/23897.
International Search Report, dated Jun. 3, 2013, PCT/US13/26516.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pp. 1-2, Jan. 11, 2010.
"Custom Elements: defining new elements in HTML", Dec. 8, 2013, 15 pages, Dec. 8, 2013.
CTNF, mailed on Jun. 29, 2018, re: Timothy Dylan Peacock, U.S. Appl. No. 15/137,824, filed Apr. 25, 2016.
CTNF, mailed on Apr. 25, 2018, re: Ganesh Jampani, U.S. Appl. No. 15/249,133, filed Aug. 26, 2016.
CTNF, mailed on Feb. 1, 2018, re: Nwokedi Idika, U.S. Appl. No. 15/204,710, filed Jul. 7, 2016.
NOA, mailed on Aug. 13, 2018, re: Daniel G. Moen, U.S. Appl. No. 14/980,231, filed Dec. 28, 2015.
CTNF, mailed on Jul. 31, 2018, re: Wesley Hales, U.S. Appl. No. 15/011,237, filed Jan. 29, 2016.
NOA, mailed on Sep. 5, 2018, re: Daniel G. Moen, U.S. Appl. No. 14/980,231, filed Dec. 28, 2015.
NOA, mailed on Sep. 17, 2018, re: Siying Yang, U.S. Appl. No. 14/942,769, filed Nov. 16, 2015.
NOA, mailed on Sep. 5, 2018, re: Michael J. Ficarra, U.S. Appl. No. 15/919,034, filed Mar. 12, 2018.
NOA, mailed on Jul. 5, 2018, re: Siying Yang, U.S. Appl. No. 15/068,468, filed Mar. 11, 2016.
NOA, mailed on Sep. 19, 2018, re: Nwokedi Idika, U.S. Appl. No. 15/204,710, filed Jul. 7, 2016.
CTNF, mailed on Sep. 19, 2018, re: Eli Mattson, U.S. Appl. No. 15/430,224, filed Feb. 10, 2017.
NOA, mailed on Oct. 24, 2018, re: Jarrod Overson, U.S. Appl. No. 15/069,667, filed Mar. 14, 2016.
NOA, mailed on Oct. 24, 2018, re: Marc R. Hansen, U.S. Appl. No. 15/148,139, filed May 6, 2016.
CTFR, mailed on Sep. 11, 2018, re: Michael J. Ficarra, U.S. Appl. No. 15/060,380, filed Mar. 3, 2016.
CTFR, mailed on Nov. 1, 2018, re: Marc. R. Hansen, U.S. Appl. No. 15/202,755, filed Jul. 6, 2016.
NOA, mailed on Oct. 26, 2018, re: Ganesh Jampani, U.S. Appl. No. 15/249,133, filed Aug. 26, 2016.
CTFR, mailed on Nov. 30, 2018, re: Siying Yang, U.S. Appl. No. 14/925,547, filed Oct. 28, 2015.
NOA, mailed on Nov. 27, 2018, re: Nwokedi Idika, U.S. Appl. No. 15/204,710, filed Jul. 7, 2016.
CTNF, mailed on Oct. 5, 2018, re: Zhiwei Li, U.S. Appl. No. 15/968,573, filed May 1, 2018.
NOA, mailed on Sep. 12, 2018, re: Justin D. Call, U.S. Appl. No. 15/645,787, filed Jul. 10, 2017.
CTNF, mailed on Nov. 29, 2018, re: Jarrod S. Overson, U.S. Appl. No. 15/059,080, filed Mar. 2, 2016.
NOA, mailed on Jan. 3, 2019, re: Bei Zhang, U.S. Appl. No. 14/859,084, filed Sep. 18, 2015.
CTNF, mailed on Jan. 24, 2019, re: Nwokedi Idika, U.S. Appl. No. 14/728,596, filed Jun. 2, 2015.
CTFR, mailed on Jan. 17, 2019, re: Wesley Hales, U.S. Appl. No. 15/011,237, filed Jan. 29, 2016.
NOA, mailed on Feb. 6, 2019, re: Eli Mattson, U.S. Appl. No. 15/430,224, filed Feb. 10, 2017.
NOA, mailed on Mar. 25, 2019, re: Siying Yang, U.S. Appl. No. 14/925,547, filed Oct. 28, 2015.
CTFR, mailed on Apr. 15, 2019, re: Jarrod S. Overson, U.S. Appl. No. 15/059,080, filed Mar. 2, 2016.
NOA, mailed on Mar. 11, 2019, re: Zhiwei Li, U.S. Appl. No. 15/968,573, filed May 1, 2018.
CTNF, mailed on May 15, 2019, re: Michael J. Ficarra, U.S. Appl. No. 15/060,380, filed Mar. 3, 2016.
NOA, mailed on Jun. 3, 2019, re: Siying Yang, U.S. Appl. No. 16/190,015, filed Nov. 13, 2018.
CTNF, mailed on May 16, 2019, re: Marc R. Hansen, U.S. Appl. No. 15/202,755, filed Jul. 6, 2016.
U.S. Appl. No. 16/190,015, filed Mar. 14, 2019, Sying Yang.
CTNF, dated Oct. 2, 2019, re: Justin D. Call, U.S. Appl. No. 16/233,634, filed Dec. 27, 2018.
NOA, dated Oct. 3, 2019, re: Marc R. Hansen, U.S. Appl. No. 15/202,755, filed Jul. 6, 2016.
CTNF, dated Sep. 24, 2019, re: Ganesh Jampani, U.S. Appl. No. 16/259,890, filed Jan. 28, 2019.
NOA, dated Oct. 17, 2019, re: Michael J. Ficarra, U.S. Appl. No. 15/060,380, filed Mar. 3, 2016.
NOA, dated Dec. 3, 2019, re: Nwokedi Idika, U.S. Appl. No. 16/236,520, filed Dec. 30, 2018.
CTNF, dated Dec. 11, 2019, re: Siying Yang, U.S. Appl. No. 16/236,519, filed Dec. 30, 2018.
CTNF, dated Dec. 13, 2019, re: Wesley Hayes, U.S. Appl. No. 15/011,237, filed Jan. 29, 2016.
NOA, dated Dec. 11, 2019, re: Jarrod S. Overson, U.S. Appl. No. 15/059,080, filed Mar. 2, 2016.
U.S. Appl. No. 16/457,589, filed Oct. 24, 2019, Zhiwei Li.

\* cited by examiner

ASYMMETRICAL CHALLENGES FOR WEB SECURITY

CROSS-REFERENCE TO RELATED APPLICATIONS

This application claims priority under 35 U.S.C. § 119(e)(1), to U.S. Provisional Application Ser. No. 62/189,189, filed on Jul. 6, 2015, the entire contents of which are incorporated herein by reference.

TECHNICAL FIELD

The subject matter of this document generally relates to computer security, for improving the operation of various computer systems.

BACKGROUND

One type of security risk faced by businesses and other entities operating on the internet is the possibility that attackers may target their online presences, and disrupt their capabilities to deliver online services. A common form of attack in this regard is known as a denial-of-service (DoS) attack, which is generally an attack that aims to make a server or other network resource unavailable to its intended users. DoS attacks are often carried out by botnets that have infiltrated many different network endpoints (e.g., client computing devices), and that exploit the endpoints to simultaneously flood a target server with thousands, or even millions, of communication requests. The extreme volume of requests can overload the ability of the server to respond to legitimate web traffic, or can at least impair the server's response time to such a degree that it becomes effectively non-responsive. In some cases, DoS attacks can be particularly effective by flooding a target server with requests to initiate web transactions that are known to be computationally expensive. For example, e-commerce websites often allow users to maintain a shopping cart of items that they may purchase. Adding and removing items from a cart can be computationally expensive due to significant backend processing performed by the server before a response is generated. Some attackers have exploited the shopping cart, and other expensive transactions, to carry out successful DoS attacks. The consequences of DoS attacks can be significant for targets of the attack, who may suffer financial loss as a result of the attack (e.g., from lost sales that would have occurred while its online services were unavailable), and who may even be harmed in the longer-term after an attack has occurred due to negative perceptions of the target's services as insecure or unreliable.

SUMMARY

This document generally describes systems, methods, devices, and other techniques for disrupting the ability of botnets and other malicious actors to carry out a DoS or other large-scale attack against one or more computing targets. In some implementations, the techniques described herein can be employed to at least partially reverse an asymmetry that has traditionally existed between web servers that are targeted in such attacks, and client devices that are exploited to perpetrate such attacks.

Consider, for example, an e-commerce website that sells products according to a "flash sales" model. In a flash sale, an online retailer (e.g., the operator of the e-commerce website) sets a product release to occur at a particular, pre-announced time. Inventory may be limited for the sale, and sales may be made in the order in which purchase requests are received from clients. Assuming sufficient demand for the product, this model can create a race among customers to complete purchases through the retailer's website if they wish to be one of the "lucky few" to come away with the product being offered for sale. Flash sales can be quite successful at driving demand for a product, as anxious customers compete for a limited product inventory. However, the success of such sales events depends on a process that affords legitimate customers a fair opportunity to make sales purchases. In some cases, however, bots have been programmed to hijack computers and to submit requests to initiate purchase transactions much faster than human operators ever could. Botnets may submit thousands or millions of purchase requests over a short period of time (e.g., over just a few seconds or fractions of a second) to the retailer in an effort to either deplete the available inventory, or simply to overload the retailer's servers so as to render them non-responsive to legitimate customers' requests.

One reason that botnets have been successful at launching DoS attacks against various computing systems is because of the asymmetry that exists in the computational effort of clients to submit requests to carry out an attack (which is minimal), and the computational effort of web servers to defend against the attack (which can be significant). For example, consider a flash sale event where, almost immediately after the sales window opens, the retailer's server is flooded with millions of illegitimate requests initiated by infected computers under the control of a botnet, but only several thousand legitimate requests from human customers. Whereas the individual acts of transmitting requests from the clients is relatively simple and computationally inexpensive, handling all of the requests at the servers, on the other hand, can be very expensive—particularly when the requests are requests to perform a relatively complex web transaction, such as to add an item to an electronic shopping cart. If the requests are well-behaved at the network layer, servers have traditionally found it difficult to discriminate among legitimate and illegitimate requests. In an attempt to handle a wave of illegitimate purchase transactions (e.g., add-to-cart), the servers may become bogged down and generally incapable of responding in a timely manner to legitimate user requests. The burden of defending an attack can thus be disproportionate relative to the effort expended by each of the infected client computers to participate in the attack.

The techniques described in this document can be used to at least partially shift this burden between the servers that are targeted in an attack and the clients that perpetrate the attack, so as to nip an attack in its early stages. In some implementations, for example, content that is served to a client computing device can be supplemented with a challenge. The client device may be required to solve the challenge, and to submit a valid solution along with any subsequent requests to the servers to initiate (perform) certain transactions. Without a valid solution, requests to the servers may be denied and the transactions may be blocked from being carried out. Challenges may deter the clients' abilities to overload a server with requests due in part to the amount of time required to solve a challenge and obtain a valid solution. For example, whereas a client may have previously been able to submit 1,000 valid requests per second under the control of a bot or botnet, the time required to solve a challenge may slow the rate of valid request submissions by several orders of magnitude. The servers targeted in an attack can therefore deal with a much smaller volume of traffic, and can more easily discern which traffic is legitimate and which traffic is not.

Different types of challenges may be employed in different implementations. In some implementations, the challenges may generally have an "asymmetrical" characteristic, in that the computational expense or time required to solve the challenge at the client device is greater than the computational expense or time required to validate that a correct solution has been determined. This characteristic can be achieved with a hashing challenge, in some implementations. For example, a web page that is to be served to a client computing device can be re-coded to include a script (e.g., JavaScript) that defines the hashing challenge. The script can be programmed so that the client automatically runs the hashing challenge, even without user intervention. In some implementations, the hashing challenge may be a program that causes the client to determine a message whose hash value matches a pre-defined hash value. A robust hashing algorithm may be selected to compute the hash value of the message, such as the SHA-2 hashing algorithm. The SHA-2 algorithm has been scrutinized and verified as being reliably non-reversible and collision resistant. These properties can prevent a client device from short-circuiting the challenge, to find a solution (i.e. the message input to the hashing algorithm) that outputs a pre-defined hash value, in a manner other than by brute force of trying different message values until the pre-defined hash value results. Other hashes or algorithms that have similar properties may be used in some implementations.

Referring again to the flash sale example, the webpage on which a product is sold may be embedded with a hashing challenge. Before the client can submit a valid request to initiate a purchasing transaction, it must obtain a solution to the challenge, which generally takes a not insignificant amount of time. A server receiving requests from clients can determine whether the requests include a valid solution, and can take appropriate action to either allow or deny the requests. In this manner, performance of computationally expensive transactions can be avoided when illegitimate requests are not accompanied by a valid solution. Further according to some implementations of the techniques described herein, safeguards can be included to prevent replay attacks and fraudulent solutions. A replay attack could occur, for example, if bots were able to solve a single challenge and repeatedly re-use the solution to that challenge in a multitude of subsequent requests—without solving additional challenges for each of the subsequent requests. To prevent such tactics, the techniques described herein can verify that solutions presented by the client computing devices have not been used more than a predetermined number of times (e.g., once). Even if a solution is technically valid in that it produces a correct hash value for a given hashing challenge, the solution may nonetheless be deemed invalid if it has been previously accepted as a valid solution, for example. In some implementations, fraudulent solutions can be prevented as well, such as solutions to invalid challenges that have been independently fabricated by an untrusted source. As is described in greater detail below, a challenge may be signed by a trusted source to ensure that a solution is presented to a valid challenge.

Denial of service attacks are often premised on an overwhelming number of requests reaching a particular server or servers for processing. This document describes techniques, however, that may prevent all or a portion of illegitimate requests from reaching a targeted server at all. To this end, intermediate servers in a network, such as nodes in a content delivery network (CDN), may determine the validity of a request before the request reaches the targeted server. The intermediate servers may allow legitimate requests to pass to the targeted server, whereas illegitimate requests may be denied without communicating the request to the targeted server. Moreover, because requests may be distributed among multiple CDN nodes, the volume of illegitimate requests handled by each node may be reduced to only a relatively small portion of the overall volume submitted during an attack.

In some implementations, the various techniques described herein may achieve none, one, or more of the following advantages. To begin, the volume of illegitimate requests processed by a web server may be substantially reduced. When intermediate servers, such as servers in a content delivery network, are employed between an origin web server and the client computer, the intermediate servers may filter illegitimate requests from reaching the origin web server, so that the origin web server can focus on responding to legitimate requests. And regardless of the presence of intermediate servers, the techniques can discern the legitimacy of a request by determining whether a solution is valid in a computationally inexpensive manner. In particular, the validity of the solution may be determined before initiating a computationally expensive transaction, so as to minimize the computing resources absorbed in handling illegitimate requests that could otherwise overwhelm a server. Additionally, the challenges may be implemented in a stateless manner that does not require a server to correlate solutions it receives to saved information about challenges that were previously served. For example, any data that may be needed to validate a solution to a challenge may be served to the client with the challenge, and then returned to the server by the client along with the solution to be used in validating the challenge. A further advantage may result in some implementations where the challenge is written in a programming language (e.g., JavaScript) that is widely adopted across many platforms so that the challenge can be universally executed by different user agents. Additionally, the challenges may be polymorphic as a further safeguard against replay attacks. Polymorphism may include constructing different permutations of challenges to be served to different client computing devices, so that the solution to any particular challenge cannot be re-used. Moreover, the challenge may utilize a robust, non-reversible algorithm so as to mitigate the risk of a solution being determined in a short-circuited manner. Additional features and advantages are apparent from the specification and the drawings.

Some implementations described herein can include a computer-implemented method. The method can include receiving, at a computing system, first code that defines at least a portion of an electronic resource that is to be served to a client computing device. The method can generate second code that defines a challenge to be solved by the client computing device. The second code can be arranged to cause the client computing device to determine values for one or more parameters that comprise a solution to the challenge, and the values for the one or more parameters that comprise the solution to the challenge may be required for the client computing device to make valid requests to initiate one or more web-based transactions. The computing system can provide, to the client computing device, the first code that defines the at least the portion of the electronic resource and the second code that defines the challenge to be solved by the client computing device. A request from the client computing device to initiate a particular web-based transaction can be received, the request including particular values for the one or more parameters that comprise a possible solution to the challenge. The computing system can determine whether particular values for the one or more parameters comprise a valid solution to the challenge, and can take action to initiate the particular web-based transaction or to not initiate the particular web-based transaction based on whether the particular values for the one or more parameters are determined to comprise a valid solution to the challenge.

These and other implementations can include one or more of the following features. The second code can be further arranged to cause the client computing device to determine values for the one or more parameters that comprise the solution to the challenge by iteratively testing different candidate values in search of values that satisfy one or more constraints associated with the challenge.

The challenge to be solved by the client computing device can be to determine a particular message that yields a pre-defined hash value when the particular message is hashed using a particular hash function. The particular message that yields the pre-defined hash value can be indicated by the particular values for the one or more parameters.

The particular hash function can be collision resistant and substantially non-reversible.

The second code can include at least one script that is written in JavaScript and that is arranged to be interpreted at the client computing device.

The electronic resource can be a web page, and the first code can include hypertext markup language (HTML) code.

The second code can further be arranged to execute automatically by the client computing device in the background (e.g., background operations) while the client computing device loads the web page and/or while a user interacts with the web page after the page is loaded at the client computing device.

Determining whether the particular values for the one or more parameters includes a valid solution to the challenge can include: identifying a pre-defined output value of a function, the pre-defined output value provided to the client computing device with the second code; identifying a pre-defined value for a first input parameter to the function, the value for the first input parameter provided to the client computing device with the second code; calculating a second output value of the function using the value for the first input parameter and the particular values for the one or more parameters included in the request; and determining whether the pre-defined output value matches the second output value.

Determining whether the particular values for the one or more parameters comprise a valid solution to the challenge can include identifying a number of times that the particular values for the one or more parameters have been received in requests from the client computing device or from other client computing devices, and can further include determining that the particular values for the one or more parameters do not comprise a valid solution to the challenge in response to a determination that the number of times that the particular values have been received in requests exceeds a replay limit value that identifies a maximum number of times that values for the one or more parameters are permitted to be accepted as a valid solution to the challenge.

Determining whether the particular values for the one or more parameters comprise a valid solution to the challenge can include verifying that the particular values were generated by the client computing device within a particular period of time after the second code was provided to the client computing device.

The step of determining whether the particular values for the one or more parameters comprise a valid solution to the challenge can be performed at least in part by one or more computers at an edge of a network, the one or more computers being separate and geographically remote from a web server system from which the first code was originally served.

The one or more computers at the edge of the network can include a node in a content delivery network.

The method can include taking action to initiate the particular web-based transaction, which can include communicating, from the one or more computers at the edge of the network and to the web server system, the request from the client computing device to initiate the particular web-based transaction.

The method can include taking action to prevent initiation of the particular web-based transaction, which can include choosing to not communicate, from the one or more computers at the edge of the network and to the web server system, the request from the client computing device to initiate the particular web-based transaction.

The second code can be generated by the web server system or by a proxy computing system that is arranged as a proxy to the web server system.

Providing the first code and the second code to the client computing device can include inserting the second code into the first code.

The method can further include, for each of a plurality of instances of electronic resources that are to be served to one or more client computing devices, generating code that defines a challenge that is unique to the respective instance of the electronic resource, such that code for different challenges is generated and provided to respective ones of the one or more client computing devices along with a corresponding instance of one of the electronic resources.

The method can further include re-coding the first code that defines the at least the portion of the electronic resource, so as to obscure an operational design of a computing system that generated the first code. The re-coding may not substantially affect a visual presentation of the electronic resource when the electronic resource is executed at the client computing device. Executing the electronic resource at the client computing device can include interpreting the electronic resource at the client computing device.

Re-coding the first code that defines the at least the portion of the electronic resource can include at least one of changing names of functions in the first code and changing values of attributes in the first code that specify properties of one or more elements in the electronic resource.

The particular web-based transaction can include a transaction to modify a listing of items in an online shopping cart (e.g., add to cart, remove from cart), a transaction to transfer money between different accounts, a transaction to create an account, a transaction to login to an account, or a transaction to modify settings associated with an account.

In some implementations, a second computer-implemented method is provided. The method can include receiving, at a computing system and over a network from a client computing device, a request to initiate a web-based transaction, the request including values for one or more parameters that are presented as a solution to a challenge that was provided to the client computing device. A determination can be made as to whether the values in the request comprise a valid solution to the challenge that was provided to the client computing device. In response to determining that the values in the request comprise a valid solution to the challenge, the method can include coordinating with a web server system to initiate the web-based transaction. The method can include, in response to determining that the values in the request comprise an invalid solution to the challenge, to block the request to initiate the web-based transaction from being communicated to the web server system so as to prevent initiation of the web-based transaction by the web server system.

These and other implementations can include one or more of the following features.

Determining whether the values in the request comprise a valid solution to the challenge can include parsing the request to identify a pre-defined hash value that was provided to the client computing device along with the challenge; using a pre-defined hash function to compute a second hash value based on the values for the one or more parameters included in the request; and determining whether the second has value matches the pre-defined hash value.

The step of determining whether the values in the request comprise a valid solution to the challenge can be performed at least in part by one or more computers at an edge of the network, the one or more computers being separate and geographically remote from a web server system from which the first code was originally served.

The values for the one or more parameters can be specified in a universal resource indicator (URI) of the request.

Determining whether the values in the request comprise a valid solution to the challenge can include identifying a number of times that the values for the one or more parameters have been received in requests from the client computing device or from other client computing devices.

The computing system can be further configured to determine that the values for the one or more parameters do not comprise a valid solution to the challenge in response to a determination that the number of times that the particular values have been received in requests exceeds a replay limit value that identifies a maximum number of times that the values for the one or more parameters are permitted to be accepted as a valid solution to the challenge.

Some implementations include a third computer-implemented method. The method can include obtaining, at a computing system, web code for a web page that is to be served to a client computing device. Web code for the web page can be modified by inserting into the web code additional, executable code that defines a challenge to be solved by the client computing device. The additional, executable code can be arranged to cause the client computing device to search for values for one or more parameters that comprise a solution to the challenge by iteratively testing different values of the one or more parameters as possible solutions until particular values are determined to satisfy one or more constraints associated with the challenge. The modified web code, including the additional, executable code, can be transmitted over a network and to the client computing device. The method can identify that the client computing device has generated a valid solution to the challenge, and in response, action can be taken to initiate a web-based transaction requested by the client computing device.

These and other implementations can include one or more of the following features.

The web code can be modified by the computing system. The computing system can be arranged as a proxy to a web server system, the proxy being separate from the computing system.

Portions of the web code can be randomly transformed into re-coded web code by a web server system that hosts the web code and from which the web code originated.

Identifying that the client computing device has generated a valid solution to the challenge can include receiving an indication that the client computing device has generated the valid solution from one or more computers that are part of a content distribution network, the one or more computers being separate and remote from the computing system.

The solution to the challenge can include a message that, when hashed according to a pre-defined hash function, correctly results in a pre-defined hash value.

Some implementations can include a computing system for constructing and validating a challenge to improve computer security. The system can include one or more of a server subsystem, a challenge generator, a communications interface, and a challenge validator. The server subsystem can serve electronic content to client computing devices and can be configured to perform web transactions in response to requests from the client computing devices. The challenge generator can generate challenge code for execution by the client computing devices, the challenge code arranged to cause the client computing devices to determine values for one or more parameters that comprise solutions to challenges defined by the challenge code. The communications interface can transmit the electronic content from the server subsystem and the challenge code from the challenge generator over a network and to the client computing devices. The communications interface can further be configured to receive requests to perform web transactions from the client computing devices. The challenge validator can (i) identify, in the requests from the client computing devices to perform the web transactions, values that are presented in the requests as solutions to the challenges, (ii) determine whether the identified values are valid solutions to the challenges, and (iii) communicate with the server subsystem to cause performance of the requested web transactions in response to a determination that the identified values are valid solutions to the challenges.

These and other implementations can include one or more of the following features.

The challenge validator can be further configured to prevent the performance of the requested web transactions in response to determinations that the identified values are invalid solutions to the challenges.

The system can further include an anti-replay module, the anti-replay module configured to determine numbers of times that values presented in the requests as solutions to the challenges have previously been presented in other requests as solutions to the challenges. The anti-replay module can also coordinate with the challenge validator to prevent the performance of the requested web transactions in response to a determination that the numbers of times that values presented in the requests as solutions to the challenges have exceeded a maximum number of times that the values are usable.

Some implementations include one or more non-transitory computer-readable media having instructions stored thereon that, when executed by one or more computers, cause performance of operations. The operations can include receiving, at a computing system, first code that defines at least a portion of an electronic resource that is to be served to a client computing device; generating second code that defines a challenge to be solved by the client computing device, the second code arranged to cause the client computing device to determine values for one or more parameters that comprise a solution to the challenge, wherein the values for the one or more parameters that comprise the solution to the challenge are required for the client computing device to make valid requests to initiate one or more web-based transactions; providing, to the client computing device, the first code that defines the at least the portion of the electronic resource and the second code that defines the challenge to be solved by the client computing device; receiving a request from the client computing device to initiate a particular web-based transaction, the request including particular values for the one or more parameters that comprise a possible solution to the challenge; determining whether the particular values for the one or more parameters comprise a valid solution to the challenge; and taking action to initiate the particular web-based transaction or to not initiate the particular web-based transaction based on whether the particular values for the one or more parameters are determined to comprise a valid solution to the challenge.

Some implementations can include one or more non-transitory computer-readable media having instructions stored thereon that, when executed by one or more computers, cause performance of operations. The operations can include receiving, at a computing system and over a network from a client computing device, a request to initiate a web-based transaction, the request including values for one or more parameters that are presented as a solution to a challenge that was provided to the client computing device; determining whether the values in the request comprise a valid solution to the challenge that was provided to the client computing device; and in response to determining that the values in the request comprise a valid solution to the challenge, coordinating with a web server system to initiate the web-based transaction, wherein the computing system is configured, in response to determining that the values in the request comprise an invalid solution to the challenge, to block the request to initiate the web-based transaction from being communicated to the web server system so as to prevent initiation of the web-based transaction by the web server system.

Some implementations can include one or more non-transitory computer-readable media having instructions stored thereon that, when executed by one or more computers, cause performance of operations. The operations can include obtaining, at a computing system, web code for a web page that is to be served to a client computing device; modifying the web code for the web page by inserting into the web code additional, executable code that defines a challenge to be solved by the client computing device, the additional, executable code arranged to cause the client computing device to search for values for one or more parameters that comprise a solution to the challenge by iteratively testing different values of the one or more parameters as possible solutions until particular values are determined to satisfy one or more constraints associated with the challenge; transmitting the modified web code, including the additional, executable code, over a network and to the client computing device; identifying, at the computing system, that the client computing device has generated a valid solution to the challenge; and in response to identifying that the client computing device has generated a valid solution to the challenge, taking action to initiate a web-based transaction requested by the client computing device.

DETAILED DESCRIPTION

This document generally describes systems, methods, devices, and other techniques for implementing user-agent challenges to distinguish legitimate and illegitimate traffic communicated to a web server. In some implementations, techniques consistent with those described herein may be utilized to interfere with the ability of botnets and other malicious actors to carry out a denial of service, or other large-scale attack, against one or more computing targets. These techniques are discussed in further detail with respect to the figures.

Figure 1:
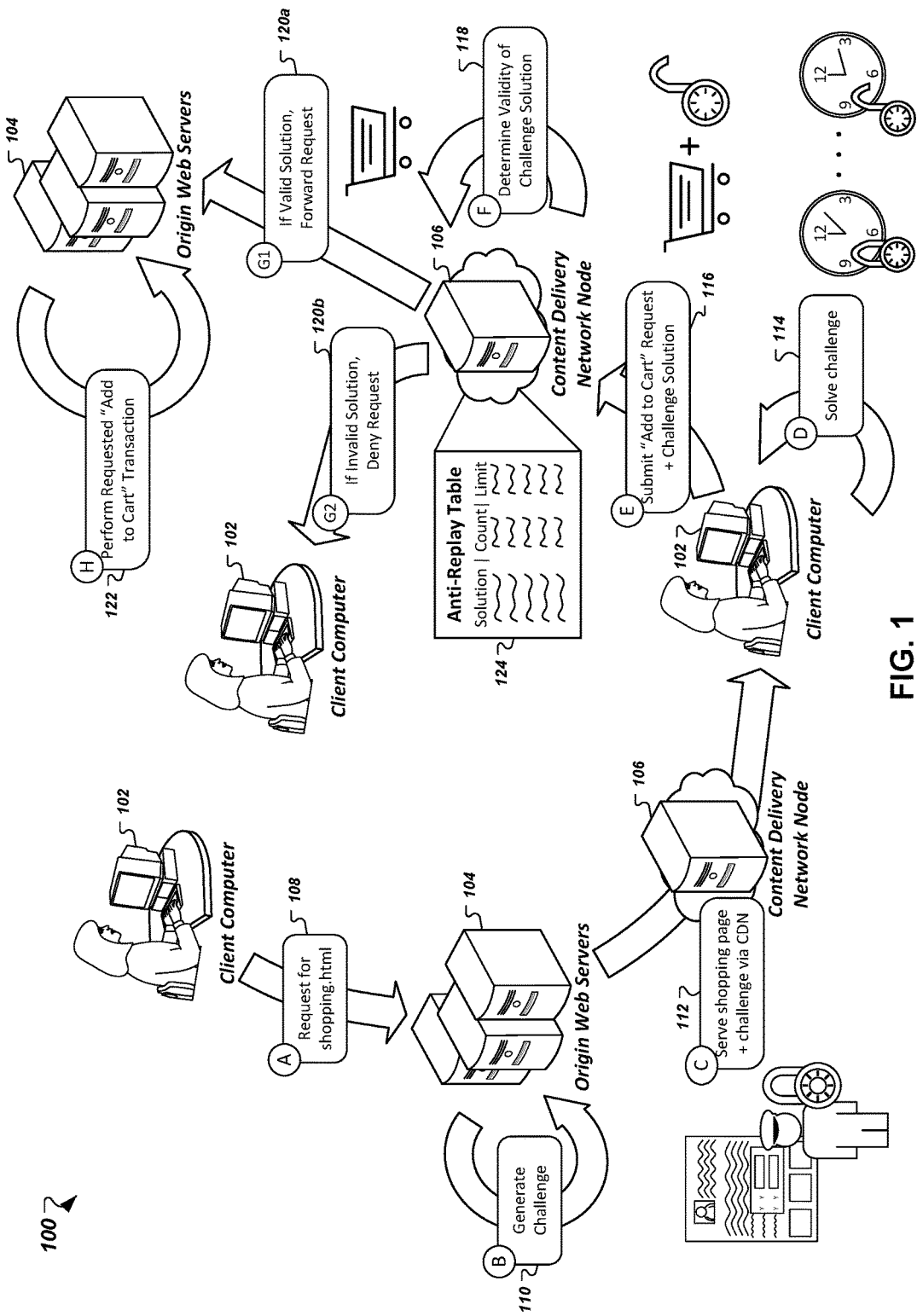
FIG. 1 depicts a conceptual flow diagram of an example process 100 for serving a web page with a challenge to be solved by a client computing device, and determining whether to perform a web transaction based on the validity of a solution presented by the client.

Turning to FIG. 1, a conceptual flow diagram is depicted of an example process 100 for serving a web page with a challenge to be solved by a client computing device, and determining whether to perform a web transaction based on the validity of a solution presented by the client. The process 100 in FIG. 1 is intended to generally illustrate how a client challenge may be constructed, served, and validated, but corresponding stages of the process 100 are described in greater detail in the description of other ones of the figures, including FIGS. 4 and 5, for example.

The process 100 can begin at Stage A (108), where a user at client computer 102 makes a request for a webpage (shopping.html) from an e-commerce website. For example, perhaps the user has visited the website for an online book retailer, and has clicked on a link to the shopping.html page, where items can be added to an electronic shopping cart for the user. The request (e.g., an HTTP request) is transmitted to a set of web servers 104 that hosts the retailer's website. The retailer may be sensitive to the possibility of attacks from botnets, such as distributed DoS attacks, and may have implemented user-agent (client) challenges as a mechanism to deter botnets from launching such attacks that could harm the retailer's online presence. Accordingly, before the shopping.html webpage is served to the client computer, it may be supplemented with a challenge.

At stage B (110), the web servers 104 can generate a challenge to serve to the client computer along with the shopping.html page. In some implementations, the challenge may be in the form of a JavaScript program that is automatically run by the client device 102 when it loads the webpage in a web browser, for example. A user interacting with the webpage may not even be alerted to the fact that the challenge code is being run or that the challenge has been completed, as the challenge may be configured to be run as a background process in some implementations. Generally, the challenge may be arranged to allow the client computer 102 to discover a solution to the challenge by running the challenge code and expending a certain amount of computational effort and time in searching for the solution. In order for the client computer 102 to submit a valid request to initiate a transaction from the shopping.html page, a valid solution to the challenge may be required with the request. The challenge may therefore be provided to the client computer 102 to substantially slow the rate at which valid requests can be made from the client computer 102, so that the client 102 could not be leveraged in a DDoS attack, for example, to flood the web servers 104 with requests to perform web transactions.

In some implementations, parameters for the challenge can be generated randomly. One type of challenge that may be employed is a hashing challenge in which the client computer is given the output of a hash, and is instructed to determine, by brute force, the input message to the hash that resulted in the pre-defined output. For example, the web servers 104 may randomly choose a key and a message for a hash, and may determine a hash-based message authentication code (HMAC) value that is an output of the hashing algorithm given the input key and message parameters. To implement the challenge, the web servers may inject code into the shopping.html page to cause the client computer 102 to try every value in a range of values as possible messages that render the correct HMAC value from the hashing algorithm. The message value that generates the correct HMAC value is then the solution to the challenge. Certain hashing algorithms, such as the SHA-2 algorithm, can serve as effective challenges due to their non-reversibility and anti-collision properties that make it extremely difficult to short-circuit the challenge and determine a solution other than by brute force trial-and-error of a range of possible messages.

With the challenge generated, at stage C (112), the shopping.html page and the challenge are served to the client computer 102. In some implementations, the challenge may be provided as in-line code directly in the shopping webpage, although the challenge may also be indirectly referenced by the shopping webpage and served in a second wave of content, for example. FIG. 1 further shows that, in some implementations, the shopping page and the challenge can be served via a content delivery network (CDN) 106. For example, operators of the online shopping website may have partnered with operators of the CDN 106 to allow content from the shopping website to be delivered through a network of distributed servers on the CDN 106, so as to increase the availability of content, reduce response times, and generally achieve better performance than what the retailer's own servers 104 may have been capable of.

At stage D (114), the client computer 104 may run the challenge code provided with the web page to determine a solution to the challenge. In some implementations, the solution may already be determined by the time the user selects to initiate a web transaction. For example, at stage E (116), the user selects the "Add to Cart" function on the shopping page. Selection of this function causes the client computer 102 to make a request to the web servers 104 to perform the function to add the user's selected item(s) to his or her shopping cart. The request can include the solution to the challenge, as well as other parameters that may be used to verify that the solution is accurate and that the challenge is legitimate (e.g., that the challenge has not been manipulated). Before the "Add to Cart" request actually reaches the web servers 104, however, the request may be validated by the CDN 106 at an edge of the network. Although the web server 104 may do the validation itself in some implementations, it can also be advantageous to validate with servers at the CDN 106 so as to reduce the volume of requests handled by the origin web servers 104. Servers in the CDN 106 may filter out invalid requests and block them from the web server 104, so that expensive transactions like "Add to Cart" are not carried out needlessly.

At stage F (118), the CDN 106 determines whether the request is valid, including verifying the accuracy of the solution determined by the client computer 102. In some implementations the CDN 106 may also check a signature included with the request from the client computer 102 to verify that the challenge was generated by a trustworthy source and has not been manipulated. The CDN 106 can also refer to an anti-replay table 124, to ensure that the solution to a particular challenge has not been submitted in previous requests over a period of time. One object of the anti-replay table 124 is to ensure that attackers cannot re-use the solution to a challenge more than a pre-determined number of times, such as once. Thus, even if a solution to a challenge is technically accurate, the request may still be deemed invalid if it is the second, third, or fourth time, for example, that the solution to the challenge has been submitted by either the client computer 102 or other client computers.

Depending on whether the request is determined to be valid, the process 100 can proceed to either allow or deny the request. If the request is deemed valid, then CDN 106 at stage G1 (120a) forwards the request to the web servers 104, and at stage H (122), the web servers 104 perform the requested "Add to Cart" transaction. But if the request is not deemed valid (e.g., if the solution is invalid, or if the solution violated anti-replay rules), the request is denied at stage G2 (120b). In the case where the request is denied, the transaction is not performed and the request may not even be communicated to the web servers 104.

Figure 2:
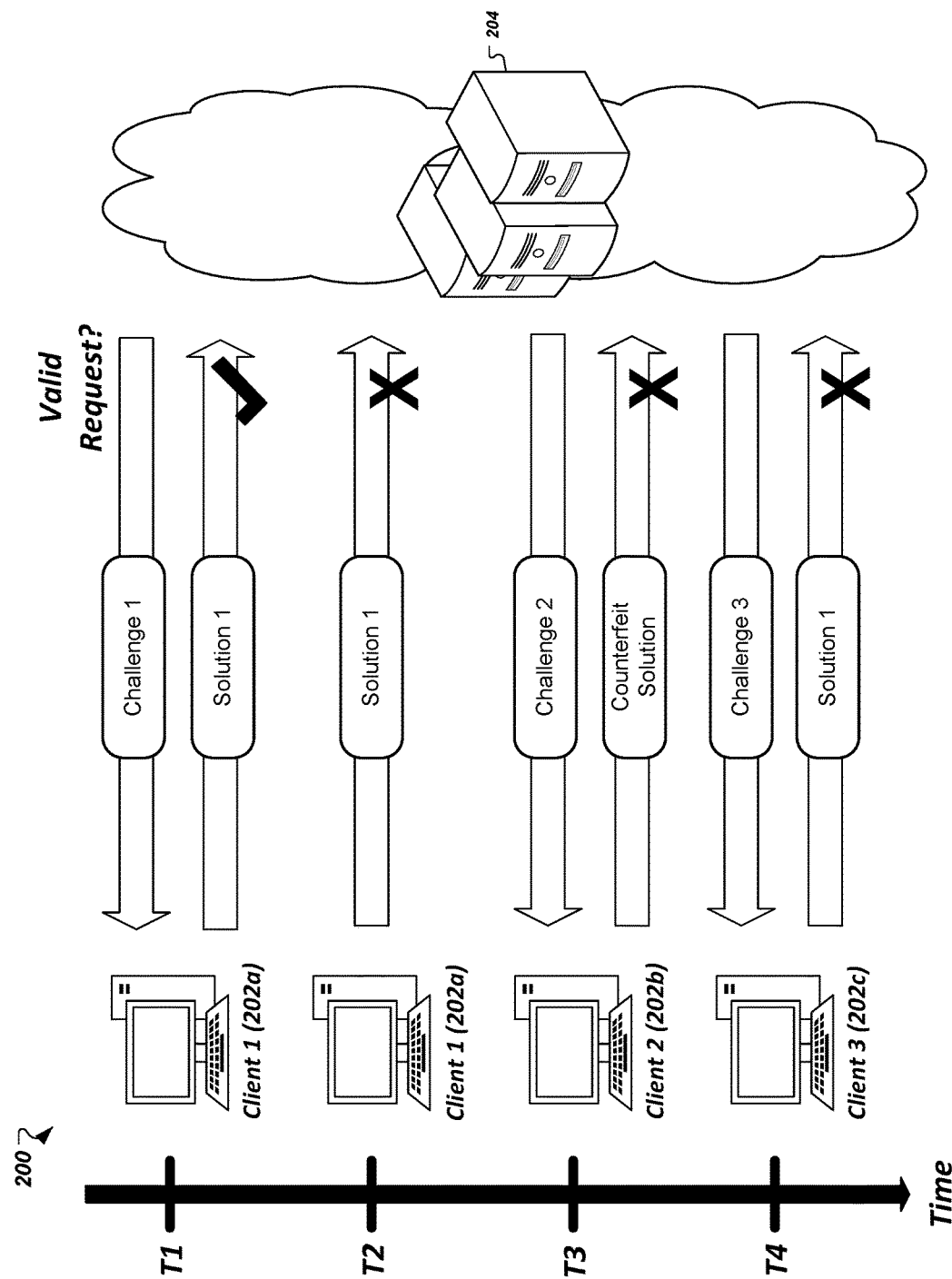
FIG. 2 depicts a timeline 200 over which various client computing devices have submitted requests including challenge solutions to a server system, in which some requests are accepted as valid and others are rejected as invalid.

FIG. 2 depicts a timeline 200 over which various client computing devices have submitted requests including challenge solutions to a server system 204. The timeline 200 conceptually depicts particular requests may be accepted and others denied. For example, at time T1, the servers 204 provide content to a first client 202a. In response, the first client 202a solves a first challenge included in the content, and submits a request to initiate a web transaction (e.g., to add items to an electronic shopping cart). The solution is accurate, and other aspects of the request are verified. The servers 204 thus accept the first request from the first client 202a so that the requested transaction can be performed.

Later, at time T2, the first client 202a re-submits a request including the same solution to the first challenge. The servers 204 may check an anti-replay log and find that the solution or the challenge has already been submitted at an earlier time, and for that reason the request may be deemed invalid. Then, at time T3, a second client computer 202b is served content including a new, second challenge. Rather than solving the challenge that it was provided, the second client 202b submits a counterfeit solution, such as a solution to a challenge that was illegitimately generated by attackers in advance of the second challenge being served. The servers 204 may detect that a signature associated with the solution is invalid, indicating that the solution and/or challenge may have been manipulated. Accordingly, request at time T3 is not accepted. Finally, at time T4, a third client computer 202c is served a third challenge with parameters that are different from either of challenges 1 or 2. The third client 202c may be infected with malware and under the control of a botnet. In another attempt to subvert the challenge, the client 3 does not wait to determine a solution to the third challenge, but instead submits a solution to the first challenge that was provided to the first client computer 202a at time T1. However, because solutions to the first challenge have already been included in requests to the servers 204, the request made by the third client 202c at time T4 is denied. Accordingly, FIG. 2 generally illustrates how various safeguards may be implemented to ensure the integrity of challenges. The host server 204 can validate requests by not only checking whether a solution proffered in a request is accurate, but also by checking that a challenge and solution are not being replayed, and by checking that the challenge has not been manipulated.

Figure 3:
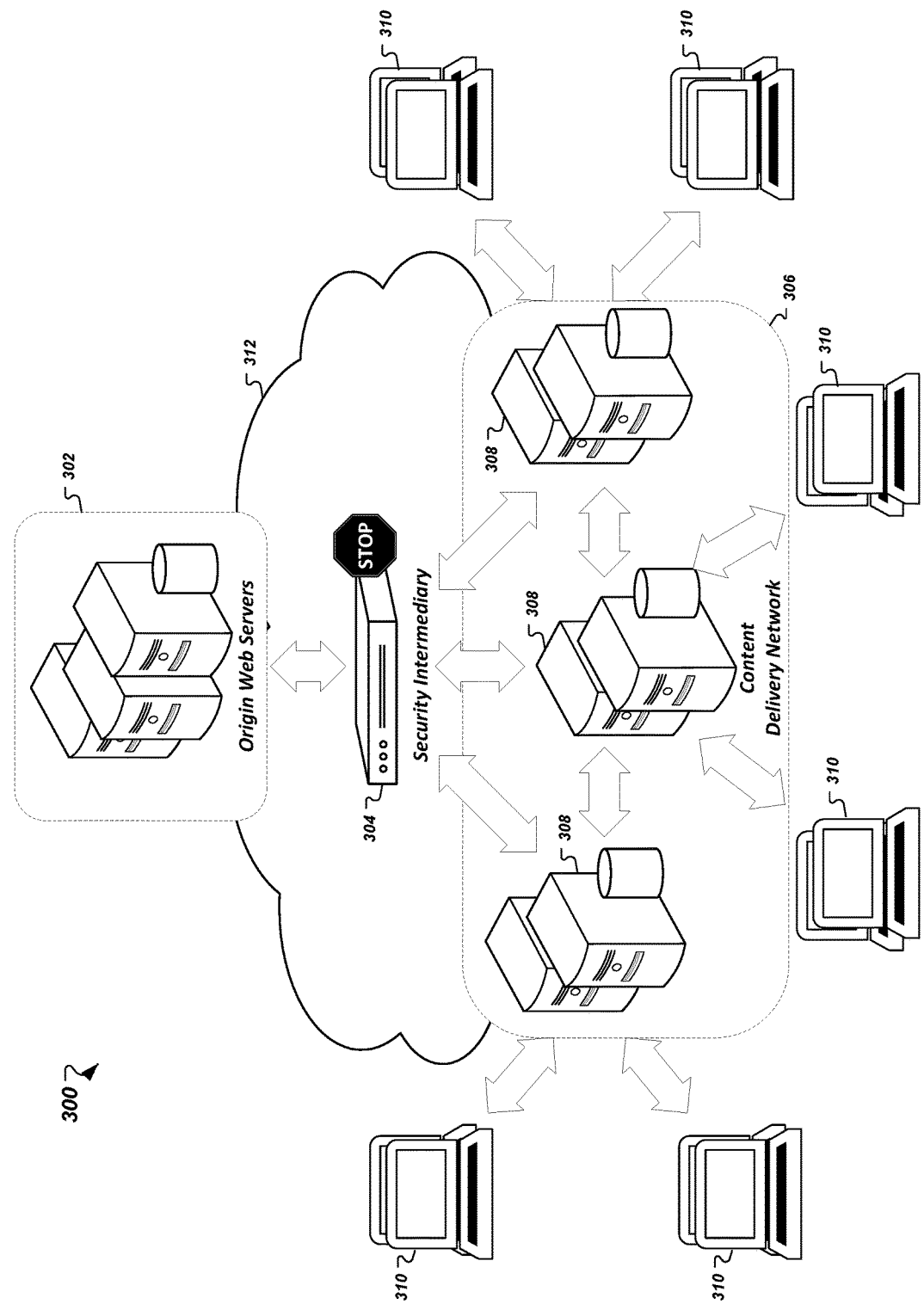
FIG. 3 depicts a schematic diagram conceptually illustrating the topography of a computer network 300 over which content is communicated between origin web servers and client computing devices via a security intermediary and a content delivery network (CDN).

Referring now to FIG. 3, a schematic diagram is shown that conceptually illustrates the topography of an example computer network 300 over which content can be communicated between origin web servers 302 and client computing devices via a security intermediary and a content delivery network (CDN) 306. Generally, the diagram in FIG. 3 is provided as a framework to describe various manners in which the methods, systems, devices, and other techniques described herein may be arranged to implement user-agent (client) challenges for the improvement of web security. Some of the figures show, by way of example, how various stages of processing for these techniques may be carried out by particular components of the network 300, such as by origin web servers 302, security intermediary 304, CDN servers 308, or client devices 310. However, the particular configurations described in these drawings are provided as examples only. In some implementations, certain of the processing stages may occur at other ones of the network components than the components that are explicitly provided in the figures, or may be distributed among multiple components.

As shown in FIG. 3, electronic content (i.e., electronic resources, such as web pages), may be transmitted to client devices using a content delivery network (CDN) 306. The CDN 306, along with the origin web servers 302 and the security intermediary 304 can be geographically separated and physically distinct from the client computing devices 310 that form endpoints of the network 300. Accordingly, the origin servers 302, security intermediary 304, and CDN 306 are all shown as being located at least partially within the cloud 312. Thus, from the perspective of one of the client computing devices 310, request and responses may appear to be sent and received generally to and from a network in the cloud 312, although distinct components within the network may handle different aspects of processing communications with the client computing device 310. The client computing devices 310 may be any of various types of computing devices that may communicate over a network, such as mobile devices (e.g., smartphones, tablets, wearables), notebook computers, or desktop computers. The client computing devices 310 may, for example, use web browsing applications to access and to execute web pages or other content over the internet or other network. The web browsing applications may have a JavaScript engine, for example, that can run challenges written in JavaScript or other suitable languages.

The CDN 306 can include a series of distributed servers 308 in data centers at a plurality of geographically dispersed locations. Different individual servers 308 or groups of servers 308 may each represent a node in the CDN 306 at an edge of the network 300. The nodes may be located at the edges of the network 300 because they are proximate to the client computer devices 310, and are thus closer in the network 300 to the client devices 310 than are other components such as the origin web servers 302. The CDN 306 may be configured to deliver content hosted by the origin web servers 302 to the client computing devices 310 with high availability and performance. The servers 308 in the CDN 306 can act as intelligent intermediaries between the origin web servers 302 and the client computing devices 310. For example, when a client device 310 submits a request for content on a domain hosted by the origin web servers 302, the CDN 306 can intelligently direct the request to the servers 308 at a particular node of the CDN 306 that is determined to be best situated to handle the request. An optimal node of the CDN 306 to handle the request may be selected based on factors such as the distance between the node and the requesting client device 310, the present availability of the node, and the nature of the particular content being requested. For example, the optimal node may be the node that is located closest to the client device 310 that submitted a request (e.g., as measured by the expected time for communications to be transmitted between the node and the client, or as measured by the node that is the fewest number of network hops away from the client). The optimal node of the CDN 306 can process the request and determine how to handle it in an efficient manner. In some implementations, each of the nodes 306 may cache content from the origin web servers 302, so that the nodes may respond to requests from client computing devices 310 with cached content, when the requested content has been cached, rather than pinging the origin web servers 302 to obtain the content for each request. In this way, the CDN 306 can significantly reduce the load on the origin web servers 302 due to the CDN's 306 distributed network of servers 308 handling requests for popular, cached content. The CDN 306 can also help to improve the response times for handling requests due to the additional computing capacity provided by the CDN's servers 308, and the distribution of requests to optimally selected nodes that may be located closest to the respective client computing devices 310 that have made requests over the network 300.

The origin web servers 302 may include a system of one or more computers 300 from which web content requested by the client computing devices 310 originates. The origin web servers 302 may serve various types of content, such as web code (e.g., HTML, JavaScript, Cascading Style Sheets) for web pages, media files, applications, and more. The origin web servers 302 may also execute server-side applications that power services delivered to the client computing devices 310. For example, the origin web servers 302 may host an e-commerce website. The servers 302 may host text, web code, images, and other media files that are part of the website, and may run various server-side applications to dynamically generate content specific to particular requests.

In some implementations, the network 300 may include a security intermediary 304. The security intermediary 304 may include one or more computers that are located in the network 300 between and distinct from the origin web servers 302 and the client devices 310. In some implementations, the security intermediary 304 may be proximate to the origin web servers 302, and may be located between the servers 308 of the CDN 306 and the origin web servers 302.

For example, the security intermediary 304 may be arranged as a reverse proxy or a full proxy in front of the web server 102. When arranged as a reverse proxy, the security intermediary 304 may intercept all or a portion of incoming communications for the origin web servers 302 (e.g., all communications forwarded from the CDN 306, but not client requests that have been blocked by the CDN 306), and may process all or a portion of outbound communications from the origin web servers 302. In some implementations, the security intermediary 304 may operate in coordination with various sites at multiple domains, which sites may be hosted on a common set of origin servers 302, or on respective sets of origin servers for each of the domains/sites. The security intermediary 304 may be implemented on dedicated computers that are physically distinct from the computers for the origin web servers 302. In some implementations, the security intermediary 304 may be implemented, not on physically separate hardware, but as one or more modules on the origin web servers 302. In some implementations, one or more security intermediaries 304 may be provided at all or particular ones of the nodes in the CDN 306 (not shown), and may be implemented as software modules within the servers 308 of the CDN 306 or as dedicated hardware co-located with the servers 308 of the CDN 306.

Figure 7:
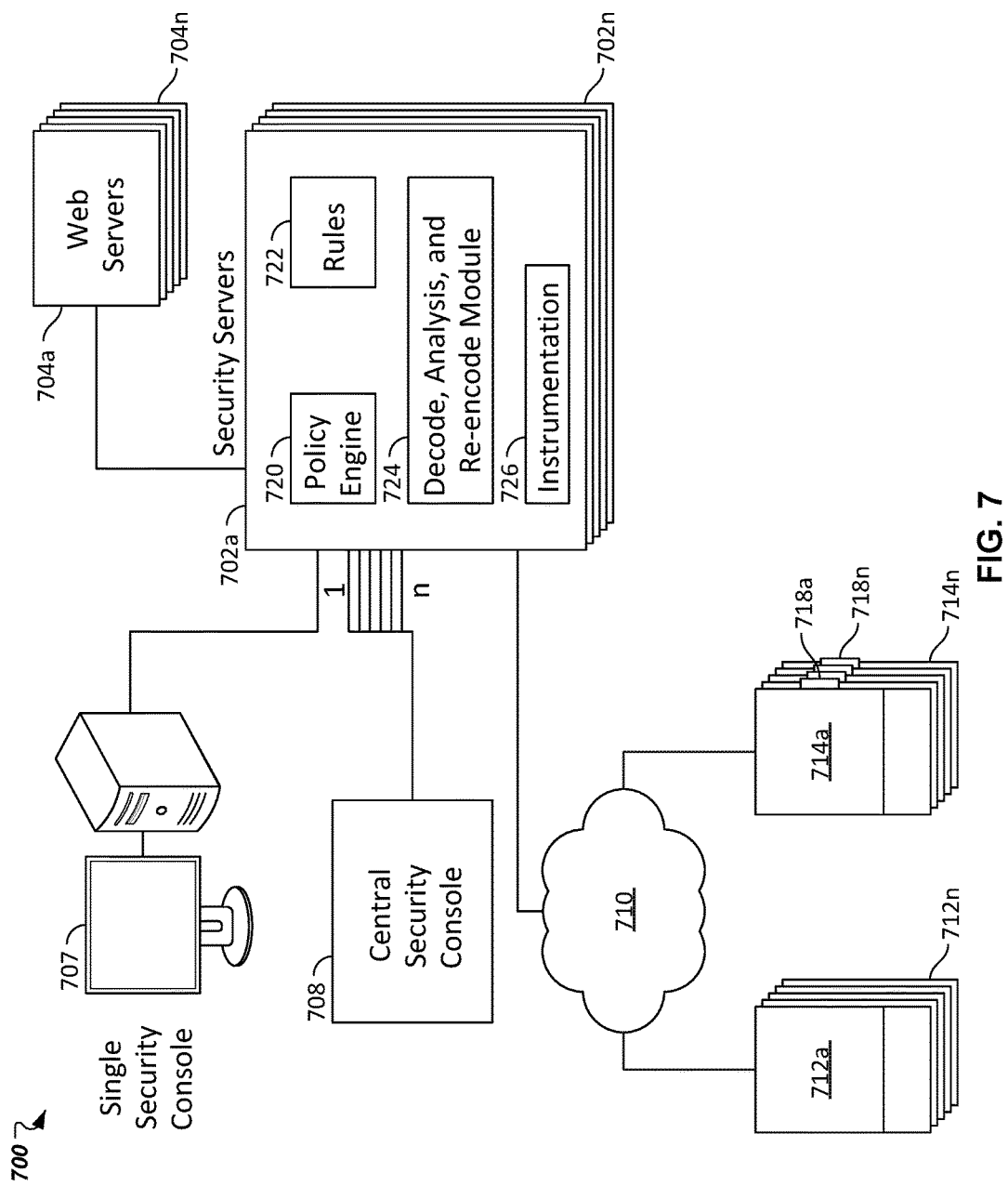
FIG. 7 depicts a system for serving polymorphic and instrumented code.

Generally, the security intermediary 304 may be programmed to perform one or more types of transformation on electronic content that is to be served to the client computing devices 310. For example, the security intermediary 304 may re-code content that is outputted from the origin web servers 302, and may apply reverse transformations to requests made from a re-coded web page on a client computing device 310 so that the request is recognizable by the origin web servers 302. Similarly, for security intermediaries 304 distributed in the CDN 306 (not shown), the security intermediary 304 may re-code content to be served to the client devices 310 from the CDN servers 308, and may apply reverse transformations to requests from the client devices 310 from a re-coded web page so that the request may be recognized by the CDN servers 308. In some implementations, each security intermediary 304 may be configured to perform operations like those carried out by the transformation module in system 400 (FIG. 4) or by the security servers 702a-n of system 700 (FIG. 7). For example, the security intermediary 304 may re-code portions of the web code for a web page that is to be served to a client device 310. The re-coding can involve applying random transformations to select portions of the original code, so as to obscure an operational design of the origin web servers 302 and/or the CDN servers 308. In some implementations, the security intermediary 304 may randomize elements of a web page's implicit API, such as form names, attribute values, and hyperlink addresses, so as to interfere with the ability of malware at the client devices 310 to exploit the implicit API to perform fraudulent transactions or other malicious actions. The security intermediary 304 may re-code content differently each time it served, for example, to create a moving target that may prevent bots from predicting how a page will be re-coded in any particular instance. In some implementations, the security intermediary 304 may re-code content in other manners as well, such as inserting decoy code, randomizing HTML tag names, and splitting form fields into multiple fields that each accept a portion of content typed by a user. In some implementations, the security intermediary 304 may instrument electronic content that is to be served to a client device 310 with code (e.g., JavaScript) programmed to collect information about the client computing device 310 that executes the content, and about interactions with the content at the client computing device 310. The instrumented code may then report the collected information over a network to the security intermediary 304 or to another portion of a computing system for analysis.

Recall that in the example process 100 depicted in FIG. 1, the challenge was generated at a set of origin web servers. The shopping.html webpage was supplemented with the challenge code at the origin web servers as well, and the supplemented code was then served to the client computer a node in a content delivery network. When the client computer thereafter solved the challenge and submitted a request, the node in the content delivery network validated the solution, and took action to either allow or deny the request based on the determined validity of the solution. However, various stages in the process 100 could alternatively take place at different ones of the components depicted in network 300 of FIG. 3. For example, the challenge may be generated and inserted into electronic content being served at any one of the origin web servers 302, the security intermediary 304, and one or more nodes of the content delivery network 306. Similarly, any one or more of these components may be configured to validate a solution provided by a client computing device 310. In some implementations, a security intermediary 304 proximate to the origin web servers 304, or proximate to the nodes in the CDN 306, may both generate and insert the challenge, and may also validate solutions to the challenge from client devices 310. In some implementations, the origin web servers 302 or the CDN servers 308 may generate and insert the challenge, and validate solutions. In some implementations, in the absence of a content delivery network 306, a security intermediary 304 acting as a proxy to the origin web servers 302 may implement challenges and validate their solutions. For example, the security intermediary 304 may intercept an outbound web page from the origin servers 302, may generate and insert a challenge into the web page, and may then transmit the re-coded web page that includes code for the challenge to one of the client computing devices 310. When the client device 310 submits a solution to the challenge, the security intermediary can again intercept the communication before it reaches the web servers 302, and can determine whether the solution is valid. If the solution is determined to be valid, the communication can be provided to the web servers 302. If not, the communication may be blocked. In some implementations, the client computers 310 can communicate with the origin web servers 302 directly, without either a security intermediary 304 or the CDN 306. In these implementations, the origin web servers 302 may generate the challenge, supplement the content to be served with the challenge, and also determine whether solutions from the client devices 310 are valid. If a solution is determined to be valid, the web servers 302 may act on the request (e.g., may initiate a web transaction specified in the request). If a solution is not determined to be valid, the web servers 302 may not respond as requested. For example, the web server 302 may return an error page to the client device 310 indicating that the requested transaction could not be performed.

Figure 4:
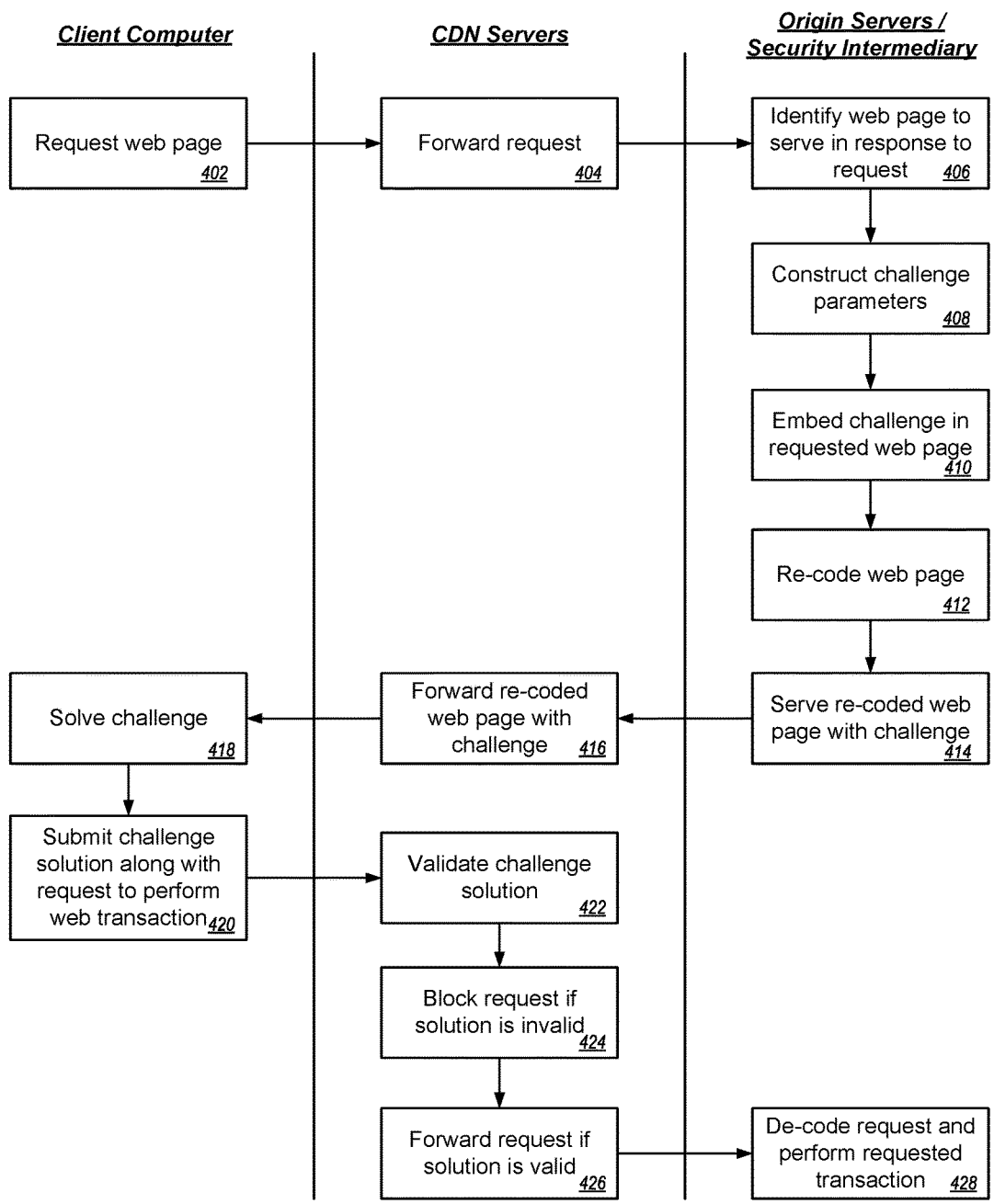
FIG. 4 is a flowchart of an example process 400 for utilizing asymmetrical challenges to improve the security of one or more computers.

FIG. 4 is a flowchart of an example process 400 for implementing and validating user-agent challenges, such as may be used to frustrate the ability of botnets to carry out denial of service attacks. Generally, the process 400 can generate a user-agent challenge that a client device must solve in order to submit a valid request to a web server. The time required to solve the challenge may slow the rate at which requests can be made by client devices under the control of a botnet. Further, the process 400 may provide various safeguards against the possibility of re-play attacks, manipulated solutions, or solutions to fraudulent challenges. The process 400 is described by way of an example with respect to an implementation involving servers from a content delivery network, origin web servers, and a security intermediary configured as a reverse proxy to the origin web servers. However, as discussed above with respect to FIG. 3, the process 300 can also be carried out with other network arrangements, such as arrangements in which the client computer directly communicates with the security intermediary, origin servers, or both, without the presence of a distributed content delivery network.

The process 400 can begin at stage 402, where a client computer makes a request for a web page. For example, the client computer may submit an HTTP request for the homepage of an online banking website. In some implementations, other types of electronic resources may be requested such as media objects, text, databases, and applications. The requested resource may be capable of execution at the client computer. In some implementations, the resource may include functions that allow a user to submit a request to initiate one or more web transactions. For example, the homepage of the banking website may be executed in a web browsing application at the client device, and the page may include an account login function. The user may input his credential into the login function, and submit the credentials with a request to the origin servers to log into the user's personal banking account.

At stage 404, the request for the web page is received at a particular node of servers in a content delivery network. The particular node may have been chosen among a plurality of nodes in the network based on factors such as the distance of the client computer to the node. For example, the CDN node closest to the client may be chosen to handle the request so as to minimize response times. The CDN may check certain parameters of the request to determine a manner in which to handle the request. For example, as shown in FIG. 4, the CDN servers may forward the request to the origin servers or to the security intermediary. In some implementations (not shown in the flowchart), the CDN servers may determine that it may respond to the request using cached content, thereby obviating the need to contact the origin servers to obtain the content. In such implementations, stages 406-414 of the process 400, for example, may then be performed at the CDN node (with the CDN servers, a distributed security intermediary proximate to the CDN node, or both).

At stage 406, an origin web server receives the client's request, and accesses the electronic resource indicated by the request. For example, in response to a request for the homepage of the banking website, the origin server may identify or dynamically generate web code for the homepage that is to be served to the client computer. The web page may include multiple components that collectively define a complete user experience, such as markup language (e.g., HTML), scripts (e.g., JavaScript), style sheets (e.g., CSS), and media files (e.g., JPEG images, video, vector graphics). At stage 406, the web server may initially access only particular ones of the components, such as HTML code that is to be supplemented with a client-side script for the user-agent challenge.

At stage 408, the web servers (or security intermediary) generates the challenge that is to be provided to the client computer. In some implementations, different challenges may be generated to accompany the responses to each of a plurality of requests from one or more client computers. For example, the parameters for a challenge may be randomly determined by the web server, to minimize the likelihood of a common challenge being provided in response to multiple different requests. In some implementations, the challenge parameters may be pre-defined before the web servers receive the specific request from the client computer. Pre-defining the challenge parameters may be advantageous to minimize the response time from the server, although the parameters may be generated during runtime after the specific request is received in some implementations.

Generally, the challenge may be programmed so as to introduce a non-zero time delay in the ability of the client computer to submit a valid request from the web page for the servers to initiate one or more web transactions. In some implementations, the challenge may comprise a script that is configured to be automatically run by the client computer when the client loads the web page. The script may be run in the background without any need for the user to select a control to initiate the script. For example, the user may type the address of the banking website into a web browser, submit a request for the page, and wait a few seconds as the page loads. As the page loads, or at some time after the page has completed loading, the browser can automatically run the script to solve the challenge. The user may begin his normal routine of typing a username and password into an "account login" form on the web page, and by the time the user selects to submit the login information, the browser may have already determined the solution to the challenge. The solution can be submitted in the request to login to the account, for example. If the solution has not yet been determined by the time the user selects to submit the account login information, the browser may delay submission of the request until the challenge is solved. In some implementations, the challenge may be programmed to not run until certain events are detected to have occurred on the client computer. For example, the client may not begin working on the challenge until the user selects a control that triggers the challenge to be run, such as a control requesting that a particular web transaction (e.g., account login) be initiated.

In some implementations, the challenge may be designed so as to ensure that the client computer cannot shortcut a prescribed manner for determining a solution to the challenge. The challenge may intentionally be a computationally expensive problem for the client computer to solve, in order to create the desired delay between the time when the web page code is received by the client computer and the time at which a valid solution is determined. If bots were able to somehow break the challenge, and determine a valid solution without the time delay, the challenge may be less effective at heading off certain attacks, in some implementations. One type of challenge that may be used in this regard is a hashing challenge. In a hashing challenge, the client computer may be provided with a hash value of an unknown message that has been hashed according to a particular algorithm. The challenge may be solved by determining the message value that yields the pre-defined hash value. Because the particular hashing algorithm may be non-reversible, no algorithmic shortcut may exist to compute the original message value from the hash value. Rather, the challenge code provided to the client computer may instruct the client to determine a solution by "brute force," such as by computing the hash of every possible message value within a range of values until the computed hash matches a particular pre-defined hash value. In addition to being non-reversible, the hashing function may further be collisionless or collision resistant, in that the likelihood of two different message values yielding the same hash value is extremely small. As such, the pre-defined hash value may only result from the hash of a single message value.

By way of example, one algorithm that may be employed in the challenge is the SHA-2 hashing algorithm. The SHA-2 algorithm is a cryptographic hash that was developed by the United States National Security Agency (NSA). The SHA-2 algorithm has been extensively tested and analyzed by data security experts, and is recognized as being very robust in terms of its non-reversibility and anti-collision properties. Other suitable algorithms may also be used in some implementations.

One challenge based on the SHA-2 algorithm can be defined by the following equation (Equation 1), as prescribed in RFC 2104:

$$hp = \text{SHA2}((r_p \oplus opad) \frown \text{SHA2}(r_p \oplus ipad) \frown r'_p)) \quad \text{Equation 1}$$

The following operators are used in Equation 1:
$\frown$ Concatenation
$\oplus$ Exclusive or (XOR)

In Equation 1, a keyed-hash message authentication code (HMAC) h is calculated based on the parameters r and r'. The opad and ipad values are pre-defined constants. The first parameter r represents the "key" for the HMAC calculation. The second parameter r' represents the "message" value for the HMAC calculation. In some implementations, in creating a challenge to serve to the client computer, the web servers may generate random values for the key r and the message r'. To create different challenges, such as may be served to different client computers, the web server can generate different r and r' values for each challenge. Polymorphic challenges can thus be created by permuting the r and r' values, so that the solution to one challenge created with a first set of inputs would not be re-usable with other challenges created with different sets of input values. In some implementations, the degree of effort required by the client computer to solve the brute force challenge can be adjusted based on the size/length of the message. Longer messages, for example, may result in challenges that are more computationally expensive to solve, and that therefore would be expected to take the client computer a longer time to solve, on average.

In some implementations, the challenge for the client computer can be to determine the message value r' that, when used with the key r in Equation 1, yields an HMAC value h that matches a pre-determine HMAC value. For example, the web server (or security intermediary or CDN server) may randomly generate input parameters r and r' for Equation 1. The web server may then compute the pre-determined HMAC value h using input parameters r and r'. Computer code for the challenge can then be generated. In some implementations, the computer code may be one or more scripts that are configured to be run at the client computer in conjunction with the requested web page. For example, the challenge may be provided as a script in JavaScript, or in any other form that the client computer is capable of running. The computer code for the challenge may specify the input key parameter r and the pre-determined HMAC value h. To solve the challenge, the computer code may include a program that, when run, causes the client computer to repeatedly try different message values in computing an HMAC value using Equation 1 and the key value r that was provided by the web server. The solution to the challenge is then the message value r' whose corresponding HMAC value matches the pre-determined HMAC value h that was provided to the client computer by the web server. The challenge thus requires the client computer to use a brute force approach to determine the correct message value r'. As the size of the message value increases, the client computer may be required to perform more iterations in testing candidate message values until the correct message is found. Moreover, Equation 1 is premised on the SHA-2 hashing algorithm and is non-reversible, there should be no practical way to shortcut the challenge to determine the correct message value. Moreover, because of the SHA-2 algorithm's anti-collision property, the only message value r that will bear the correct, pre-determined HMAC value h is the message value r that was earlier determined by the web server to construct the challenge.

At stage 410, the process 400 supplements the web page that is to be served to the client computer with the challenge code that the client can run to solve the challenge. In some implementations, the challenge code may be inserted directly into web code that defines the web page. For example, when the challenge code is provided in JavaScript, the challenge code may be inserted into an HTML file for the web page. In some implementations, the challenge code may not be directly inserted into the web code for the web page as in-line code. For example, a reference to a separate file on the web server that includes the challenge code may be provided in the web code. The client computer may parse the web code, identify the reference to the file, and download the challenge code separately from the web code. In some implementations, as shown in FIG. 4, the web server or security intermediary may supplement the web code with the challenge code. In some implementations, a CDN server may supplement the web code with the challenge code.

At stage 412, the process 400 codes the requested web page to include security countermeasures in addition to the challenge code. In some implementations, the additional countermeasures are included by the web server in the first instance when the web page is served. In some implementations, however, initial web code served by the web server can be re-coded to include the additional security countermeasures. For example, a security intermediary that is proximate to the web server (e.g., as a proxy to the web server) and/or a security intermediary that is proximate to a CDN server, may intercept web code transmitted by the web server, and may modify the intercepted code to incorporate the additional countermeasures before the code is provided to the client computer. The additional security countermeasures may be configured to improve the security of the web page in various manners. Some countermeasures, for example, may obscure the operational design of the web server by applying randomized transformations to portions of the code. For example the web page's implicit API, such as form names, attribute values, and hyperlink addresses, may be randomized so as to interfere with the ability of malware at the client devices 310 to exploit the implicit API. The changes to the code may be made in a manner that does not disrupt either the functionality or the appearance of the web page from the user's perspective, but that nonetheless protects the code from being exploited by alien software (e.g., malware) on the client computer. For example, changes to the implicit API may make elements of the web page difficult to properly recognize. Moreover, if other elements are added, scrambled, deleted, or otherwise modified in the web page code, bots may be unable to properly locate the form fields and APIs necessary to properly initiate a desired web transaction. The re-coding may also be polymorphic, so as to create a moving target for bots that may attempt to analyze how a page has been re-coded across multiple servings of a web page. By re-coding the web page randomly, or otherwise differently, each time the page is served, bots may not be able to predict how a page will be re-coded in any given instance. Changes in the re-coding across servings can also be made in a manner that defies determination of a pattern to the re-coding. Generally, the process 300 may re-code the web page to add additional security countermeasures in a like manner as the security servers 702a-n depicted in FIG. 7. In other words, the re-coding stage 412 of the process 400 can involve performing techniques like those carried out by the security servers 702a-n. In some implementations, the countermeasures introduced into the web code at this stage can provide defenses against other types of attacks that the challenge code may not be equipped to handle. For example, inserting challenge code into content delivered to client computers may be effective to prevent botnets from carrying out large-scale Distributed Denial of Service attacks. But even with the challenge code, a portion of requests from clients may be deemed valid if a correct solution to a challenge is presented. Some other countermeasures may prevent other forms of attacks for these requests that have valid challenge solutions, but that may still be nefarious (e.g., credential stuffing, cross-site request forgeries, content spoofing, man-in-the-browser attacks).

At stage 414, the re-coded web page, including the challenge code and the necessary parameters for solving the challenge, is served to the client computer. The path to communicate the re-coded page to the client may depend on the network configuration. For example, if a security intermediary proximate to the web server intercepted code from the web server to inject the challenge code and add other security countermeasures, the security intermediary may transmit the re-coded page over the Internet and to the client computer. If the content provider has arranged for distribution of content through a content delivery network, the re-coded page may transmitted to the client computer a node of the CDN. For example, servers at a node in the CDN may receive the re-coded page from the security intermediary, and at stage 416, may forward the page to the client computer.

At stage 418, the client computer can receive the re-coded web page including the challenge, and can proceed to determine a solution to the challenge. In some implementations, the challenge code can be automatically run by the client computer without direct involvement by a user. The challenge can even be solved before a user submits a request to initiate a web transaction, so that the solution is available for immediate transmission when the user makes the request. If the challenge has not yet been solved, the client computer may continue to run the challenge until a solution is determined, and may then communicate the request over the network (e.g., to the web server) upon completion of the challenge. In some implementations, the challenge may be programmed to not be run until the occurrence of certain events is detected, such as a user's selection to submit a request to initiate a particular web transaction. This approach may be beneficial where computer resources are limited, so that the client does not spend unnecessary time and effort on solving a challenge until it is confirmed that the user intends to request initiation of a web transaction for which a valid solution to the challenge is required.

Figure 5:
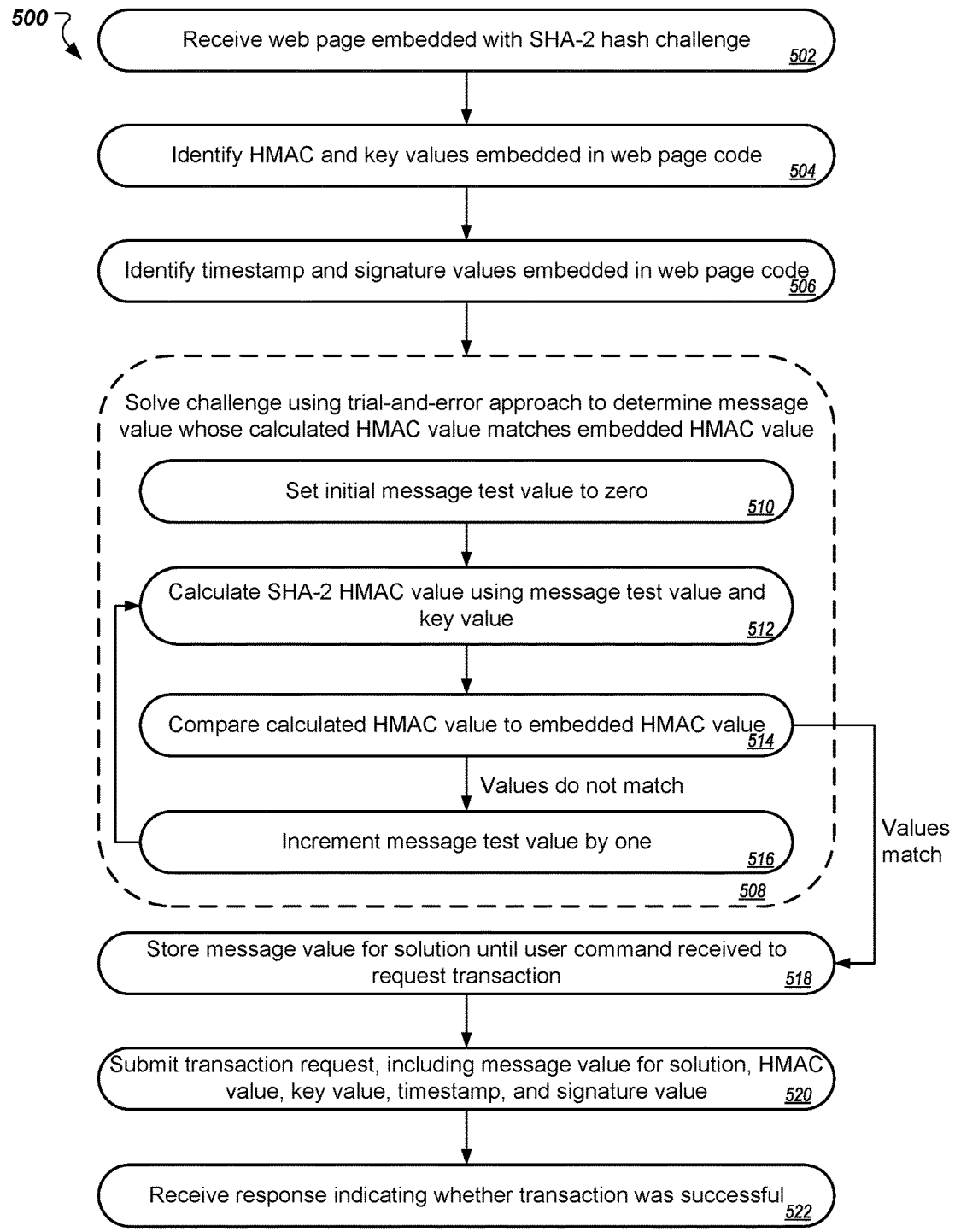
FIG. 5 is a flowchart of an example process 500 for solving a SHA-2 hashing challenge by a client computing device.

Stages 418 and 420 are expounded in greater detail in FIG. 5, which generally depicts a flowchart of an example process 500 for solving a challenge at a client computer. In the example process 500, the challenge to be solved is the determination of a message value r' that yields a pre-determined HMAC value h when the message value r' is used as an input parameter in Equation 1.

The process 500 can begin at stage 502, when the client computer receives the re-coded web page along with code for performing the SHA-2 hashing challenge based on Equation 1. At stage 504, the client identifies the pre-determined HMAC value h and the key value r for the challenge, which may be specified in the web page code. Recall that the key value r is a second input parameter to Equation 1, along with the message value r'. When constructing the challenge, the web server or security intermediary, for example, may have randomly generated the values for r and r', and used those values to compute the pre-determined HMAC value. The HMAC value h and key value r may be provided to the client computer, but the r' value is withheld, so that the client computer can independently determine r' when executing the challenge.

At stage 506, the process 500 can identify a timestamp t and a signature value s that have been provided in or along with the challenge code. These parameters s and t may be later used by the CDN, a security intermediary, or the origin web servers as anti-manipulation measures that can guard against the possibility of validating solutions to fraudulent challenges, for example. Such measures may also ensure that solutions to the challenges are computed and submitted in a timely manner. For example, one would expect that a solution to a challenge would be determined within minutes of the challenge being served. If, however, bots had pre-emptively solved a challenge in advance of the challenge being served, then the anti-manipulation measures may not accept the solution as being valid (even if the r' message value is technically correct). Likewise, challenges that were solved after too long a delay from the time the challenge was served may indicate a problem, which the anti-manipulation measures may guard against (e.g., if a bot saved a challenge for later submission during an attack).

In some implementations, a signing scheme may be an effective mechanism to guard against the types of manipulation discussed above. In such a scheme, the signature value s may be generated using a secret key possessed only by entities that are deemed trustworthy, such as trusted servers on the CDN, the security intermediary, and/or the origin web servers. Fraudsters who lack the secret key would be unable to spoof a challenge that requires a valid signature to be deemed valid. For example, the web server (or CDN or security intermediary) may generate a signature s that is unique to the particular challenge served to the client computer. The client computer may then return the signature s, along with other necessary parameters, in a request to the web server, CDN, or security intermediary to initiate a web transaction, so that the integrity of the challenge and solution can be verified.

In some implementations, the signature value may be calculated according to the following equation (Equation 2):

$$s_p = \text{HMAC}(k, (h_p \frown t)) \qquad \text{Equation 2}$$

As shown above, in Equation 2, the signature value s is calculated using a hashed-message authentication scheme such as HMAC/SHA-2. The HMAC function in Equation 2 can be the same HMAC function from Equation 1, for example, but the input parameters are now (i) the secret key k and (ii) the concatenation of the pre-determined HMAC value h with timestamp t, rather than (i) the shared key r and (ii) the message value r', as provided respectively in Equation 1. In addition to the secret key, the signature value s is thus also a function of the HMAC value h and the timestamp t. As such, the signature is uniquely tied to the HMAC value h of each challenge, and also to a particular time t associated with the challenge. In some implementations, the timestamp t may be a time at which the challenge was generated or a time at which the challenge was prepared to be served to the client computer. The signature s, timestamp t, and HMAC value h can all be provided to the client computer with the challenge code, and can be returned by the client computer when a request is made to initiate a transaction. The computing system which is tasked with validating a solution to the challenge (e.g., the web server, CDN, or security intermediary) may then use the returned parameters from the client computer, along with the calculated solution r', the shared key r, and the secret key k known to the computing system to validate that the solution r'.

At stage 508, the client can solve the challenge using a brute-force approach to determine a message value r' whose calculated HMAC value using Equation 1 matches the pre-determined HMAC value h provided with the challenge. The challenge code (e.g., JavaScript) provided by the web server, for example, may include the necessary code to cause the client computer to run the brute-force approach to solving the challenge. In some implementations, stage 508 can include the following sub-stages that allow a range of the message values to be tested by the client computer in search of the correct message value r' that comprises a solution to the challenge. At sub-stage 510, an initial test message value $r_t'$ is set to zero. At sub-stage 512, the client calculates the SHA-2 HMAC test value $h_t$ using the current value of $r_t'$ (which is initially zero) according to Equation 1. At sub-stage 514, the client compares the calculated HMAC test value $h_t$ to the pre-determined HMAC value h that was provided to the client with the challenge code. If the HMAC test value $h_t$ does not match the pre-determined HMAC value h, then the process 500 proceeds to stage 516 and increments the HMAC test value $h_t$ by one. The process 500 then returns to sub-stage 512 and repeats. When a test value $h_t$ is found that matches the pre-determined HMAC value h, the process 500 ends the loop and proceeds to stage 518.

At stage 518, the client computer stores the message value until it is needed. For example, the client computer may have automatically executed the challenge code before a request is made that requires a solution to the challenge. When the user selects a button or other control on the web page to transmit information in a form so as to initiate a transaction at the web server, the solution can then be accessed and is readily available to submit in the request without additional delay.

At stage 520, the client computer submits a request to initiate a transaction (e.g., a request to login to an account, to initiate a financial transaction, or to add an item to an electronic shopping cart). The request can include, for example, the calculated HMAC value as the solution to the challenge, the pre-determined HMAC value h, the shared key value r, the timestamp t, and the signature value h. Even though the only one of these values in the request to have been specifically computed by the client computer may be the calculated HMAC value that comprises the solution to the challenge, the other parameters can be returned to the validating computing system so that the solution can be readily validated. In this manner, validation can be stateless, in that the request itself can include all the information necessary to perform the validation (other than the secret key k, for example). The validating computing system thus has no need to correlate the transaction request with stored information about the challenge that was provided to the client computer at an earlier time. Instead, the transaction request may include all the necessary parameters to validate the solution determined by the client computer, and all the necessary parameters for the web server to re-compute the signature value s and determine whether it is a valid match to the signature s returned from the client computer. If the web server or other portion of a computing system that is arranged to evaluate the client's request determines that the request is valid, then the client's requested transaction may be carried out. If the web server determines that the request is invalid (e.g., as a result of an incorrect solution or the signature indicating another problem with the request), then the client's requested transaction may be blocked. At stage 522, the client computer can receive a response page that indicates whether the transaction was successfully performed.

Referring again to FIG. 4, at stage 420 the client computer submits a request to perform a web transaction, and the request can include the solution to the challenge that the client computer has determined. As discussed with respect to stage 520 in FIG. 5, the request may also include all other non-secret parameters that the web server, CDN, or security intermediary may use to re-construct and validate the solution to the challenge. In the example depicted in FIG. 4, validation is performed at a node in the CDN, rather than at the origin web servers or at a security intermediary proximate to the web servers. The CDN servers themselves may be used to validate the solution, or a distributed security intermediary co-located at the CDN node may validate the solution in some implementations. In some implementations, one advantage that may result from pushing the validation operations from the origin web servers to the CDN is that invalid requests can be processed and filtered out before they ever reach the origin web servers. This arrangement can improve security of the web servers by keeping potentially malicious requests away from the servers, and can also significantly reduce the load on the origin servers by reducing the volume of traffic arriving at the origin servers. The distribution of servers in the CDN may also allow the CDN to handle validation of only a portion of the overall volume of requests to a web server at each node in the CDN, which may be more manageable than if the origin web servers were to centrally validate the total volume of requests.

The request from the client computer can be validated based on one or more measures. In some implementations, multiple measures be verified in order for the request to be deemed valid. If any of the measures is not verified, the request may be deemed invalid. First, the CDN (or the origin web servers or a security intermediary in some implementations) may verify that the solution to the challenge provided in the request is valid. In some implementations, the solution can be validated by applying the client's proffered solution to the HMAC/SHA-2 hashing algorithm of Equation 1, and verifying that the resulting HMAC value matches the pre-determined HMAC value h. The pre-determined HMAC value h may have been originally calculated by the web servers or other portion of a computing system that constructed the challenge, then provided to the client computer as part of the challenge code. The client computer may then return the pre-determined HMAC value h in its request to initiate the web transaction, and the CDN can extract the value h from the request in order to validate the solution. Note that, in some implementations, the amount of computational effort involved in determining the solution to the challenge at the client computer and the amount of computational effort involved in validating the solution (e.g., by the CDN) can be highly asymmetrical. In particular, the client's effort to determine the solution may be much greater than the CDN's effort to validate the solution. For example, with the HMAC/SHA-2 hashing algorithm of Equation 1, the computational burden for the client computer to determine a solution is generally a function of the maximum size of the message r'. If the size of the message r' is limited to four bits, the client may test up to 16 different possible message values before finding the value that will derive the correct HMAC value h. If the message value was randomly selected with an even probability distribution among each of the possible message values r', then the client computer would be expected to test an average of 8 message values before arriving at the solution. More generally, the average computational burden for the client computer may be calculated as follows (Equation 3):

$$n=2^b/2 \qquad \text{Equation 3}$$

In Equation 3, n represents the average number of iterations required for the client computer to find a solution, and b represents the maximum size of the message value in number of bits. Thus, increasing the maximum size of the message value results in an increase in the average number of iterations required for the client computer to find a solution, and would thus be expected to add a greater delay in the time before the client computer can submit a valid request to perform certain web transactions. In contrast, regardless of the message size, the CDN or other portion of a computing system that validates the solution can generally do so in just one iteration by evaluating Equation 1 using parameters provided in the request from the client computer.

In some implementations, the signature s may be used as a second measure to validate the request from the client computer. Recall that the web server or other portion of a computing system that generated the challenge for the client computer may have also generated a signature s and a timestamp t. The signature s may be uniquely associated with the particular challenge that was provided to the client computer because the signature s may partly be a function of one or more parameters that define the challenge. For example, as shown in Equation 2 above, the signature s may be calculated by determining the HMAC/SHA-2 value of a message that consists of the pre-determined HMAC value h concatenated to the timestamp t. The signature s can further depend on the value of a secret key k that is known only to trusted entities such as operators of the web servers, security intermediary, and CDN. The signature s can be used in validating the request by re-computing the signature s at the CDN (or other portion of a computing system tasked with validating the request, such as the origin web servers or security intermediary) according to Equation 2 using parameters returned by the client computer in the request, including the pre-determined HMAC value h and the timestamp t. If the re-computed signature s matches the signature s returned from the client in the request, then the signature may be deemed valid. A valid signature s can indicate that the client computer has submitted a solution to a legitimate challenge. For example, attackers who attempted to independently generate an unsanctioned challenged and who attempted to submit a corresponding solution to the challenge, would be unsuccessful due to an inability to generate a valid signature s. In particular, without the secret key that is possessed only by trusted agents, the attackers would be unable to generate a valid signature s. Moreover, incorporating the timestamp t into the computation of signature s can allow the CDN to ensure that a request complies with one or more time constraints. For example, to prevent bots from collecting many challenges over a period of time, determining solutions to those challenges, and launching a DoS attack using the solutions to the accumulated challenges, the CDN may discard as invalid requests whose timestamps are "stale" (too old). Thus, if more than a pre-defined maximum length of time (e.g., 1 hour) has elapsed between a time indicated in the timestamp and a time at which the client submits the request to initiate the web transaction, then the request may be deemed invalid. In some implementations, the request may be deemed invalid as untimely even if the solution to the challenge correctly generates the expected HMAC value h. Moreover, by incorporating the timestamp t into the signature s, attackers may be prevented from submitting a fraudulent timestamp.

In some implementations, the CDN (or other portion of a computing system configured to validate the request from the client computer) may further validate the request by a third validation measure, which can involve checking one or more anti-replay safeguards. The anti-replay safeguards can indicate a number of times that any solution to a particular challenge has been previously included in requests from one or more client computers over a period of time. In some implementations, the anti-replay safeguards can indicate a number of times that a particular solution to a particular challenge has been previously included in requests from one or more client computers over a period of time. If the number of times that solutions, whether generally or particularly, have been submitted for a particular challenge meets or exceeds a pre-defined maximum number, then the CDN may block the client's request as invalid. In some implementations, a request may be blocked for violating anti-replay rules even if the request otherwise includes a valid challenge solution and a valid signature. One reason for implementing these safeguards is to prevent attackers from carrying out replay attacks in which the solutions to one or more challenges are repeatedly re-used. The safeguards may thus help to prevent a scenario in which attackers determine a solution to one challenge, and distribute the solution and other applicable challenge parameters across a network of infected devices to carry out an attack without having determined an individual the solution to respective challenges for each request submitted in the attack. In some implementations, the maximum number of times that a solution may be accepted may be set to one, so that any replay submissions are rejected. In some implementations, the CDN or other portion of the computing system configured to validate requests, may maintain a log of solutions received in requests from client computers over a period of time. Upon receiving a new request from a client computer, the CDN can check the log to determine how many times a solution to the particular challenge indicated in the new request has been submitted in prior requests, or a number of times that the particular solution indicated in the new request has been submitted in prior requests from the same client computer or other client computers. If the number of times meets or exceeds a threshold, then the CDN may deem the request invalid and may take appropriate action to block the requested transaction from being performed. In some implementations, each node in the CDN may maintain its own anti-replay log. In some implementations, the CDN may synchronize logs across the various nodes in the CDN, or each of the nodes may access a log stored at a centralized location such as at the origin web servers or at a security intermediary.

In some implementations, the computational effort involved in checking anti-replay safeguards can be reduced through the use of caching at the CDN. For example, without caching the CDN (or origin web servers or security intermediary, for example), may be burdened with looking up up one or more parameters for the solution or challenge specified in each new request from a client computer in the anti-replay log. Consider an implementation in which the pre-determined HMAC value h is used as a measure of how many times a particular challenge has been previously submitted for validation. The anti-replay log may have entries for each HMAC value h received in various requests. To eliminate a need for the CDN to check the log each time a replay request is received, the challenge code may be programmed to cause the client computer to transmit the pre-determined HMAC value h and the message solution value r' as part of the path in the URI (e.g., http://www.acme.com/addtocart/h/r'/?sku=100456). By transmitting the h and r' parameters in this manner, the first time that the h value is found in the anti-replay table, the web server can set the headers in the response to cause the CDN to cache the response at an edge. All subsequent requests for the same URI may then be delivered the same response as was delivered the first time that the h value was found in the anti-replay log, but without bothering to consult the log again. The message value r' that the client has determined as the solution to the challenge can be included in the path so that an attacker attempting to reverse engineer the challenge code provided to the client may recognize that without calculating the value of r', a valid URI cannot be constructed.

At stages 424 and 426, the CDN can take appropriate action depending on whether the request from the client computer is determined to be valid. Generally, if the request is determined to be valid, the request is allowed to pass to the web servers so that the requested transaction can be performed. For example, an item may be added to a user's shopping cart, money may be transferred between two accounts, or an account may be logged into depending on the particular transaction at issue. In some implementations, requested transactions may involve running one or more back-end programs at the origin web servers. Accordingly, the CDN may forward the request to the web servers (stage 426) if the request is deemed valid. At stage 428, the origin web servers perform the requested transaction. The request may also be de-coded by the web servers or the security intermediary by applying transformations that are the reverse of the transformations made at stage 412, so that the request can be properly interpreted by the web server. On the other hand, the CDN may not communicate the request to the web servers if the request is deemed invalid (stage 424), thereby blocking performance of the requested transaction.

Figure 6:
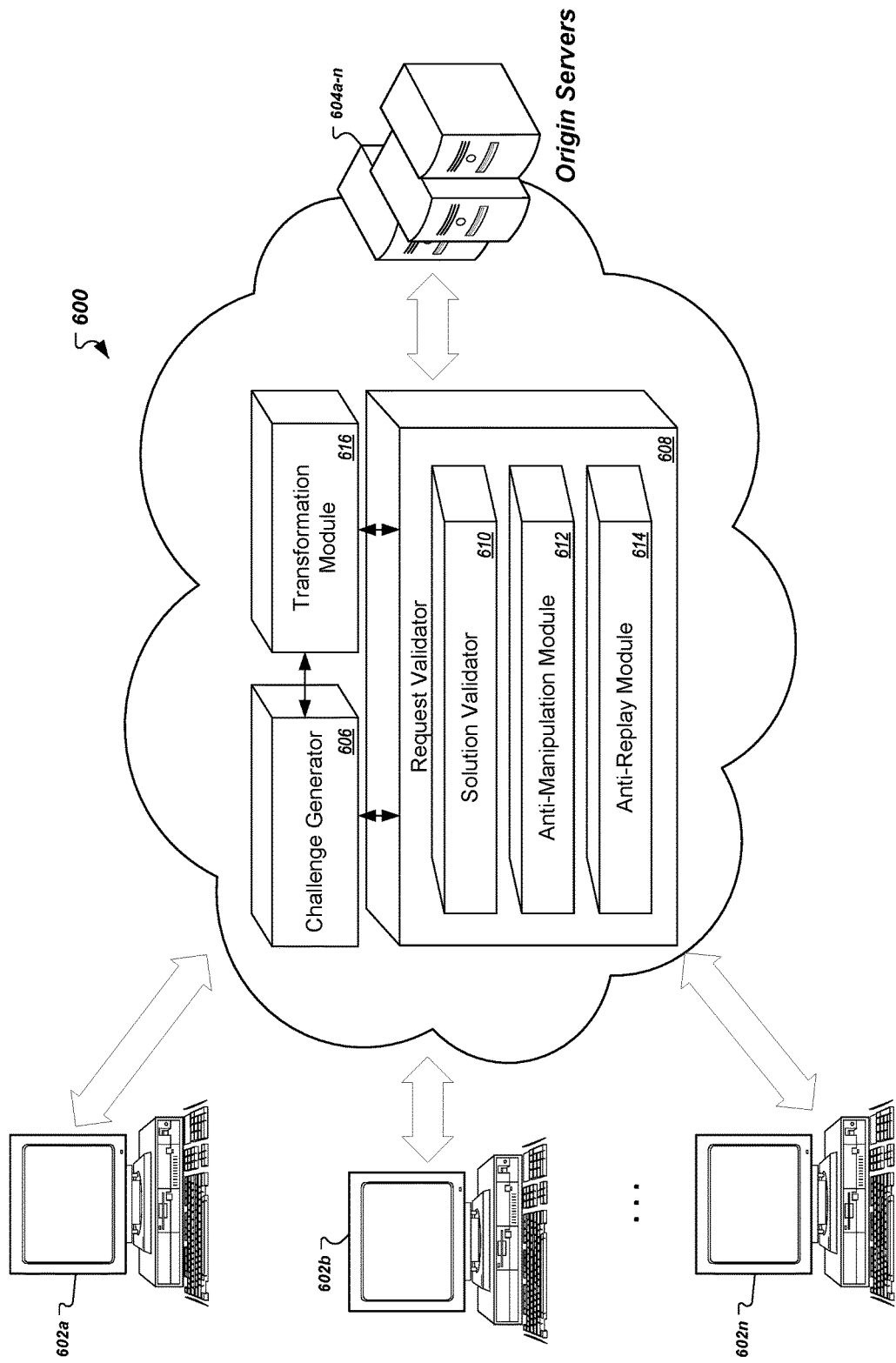
FIG. 6 is a block diagram of a computing system 600 for implementing asymmetrical challenges in served content to improve the security of one or more computers.

Turning to FIG. 6, a block diagram is shown of an example computing system 600 for implementing asymmetrical challenges in served content to improve computer security. The system 600 can include a challenge generator 606, a request validator 608, and a transformation module 616. In some implementations, the system 600 may include one or more communications interfaces for communicating with one or more servers 604a-n and a plurality of client computers 602a-n over a network (e.g., the Internet). The servers 604a-n may most host content that the system 600 can supplement with code for causing the client computers to solve a challenge. For example, the servers 604a-n may host content for a web site. The client computers 602a-n may request content from the servers 604a-n, and the system 600 may re-code the requested content before to inject challenge code for execution on the client computers before the content is delivered to the clients 602a-n. In some implementations, the system 600 may also be said to encompass the origin servers 604a-n. For example, the system 600 may be implemented as one or more modules within the origin servers 604a-n, or the system 600 may be implemented in dedicated hardware across one or more computers separate from the origin servers 604a-n. Generally, various suitable configurations of a network in which the system 600 may operate is described in greater detail with respect to FIG. 3. Particular aspects of the system 600, for example, may be implemented at the origin web servers, at one or more security intermediaries, at servers at the edges of a content delivery network (CDN), or in coordination among various these various computers. In some implementations, the system 600 may be configured to perform all or portions of the processes 400 and 500 as described with respect to FIGS. 4 and 5, above.

The challenge generator 606 is arranged to create challenges to serve to the client computers 602a-n, and to serve the challenges along with content that the client computers 602a-n have requested from the origin web servers 604a-n. Generally, the challenges may include client-executable code, such as JavaScript, that the client computers 602a-n can run in order to determine a solution to the challenge. The solution may be a required parameter to include in requests to the origin servers 604a-n to initiate certain web transactions. Requests to initiate web transactions that lack a valid solution to a challenge may be denied in some implementations. In some implementations, the challenges may serve as a mechanism for slowing the rate at which botnets can submit requests to the web servers 604a-n. The rate of computationally expensive requests received by the web servers 604a-n may be degraded to such a degree that botnets are unable to successfully carry out a distributed denial of service attack, for example.

In some implementations, the challenge generator 606 can randomly generate parameters for each challenge that is to be served. In this way, each time a challenge is served, the different parameters may generally require each of the client computers 602a-n to generate a solution that is unique to the particular challenge that was served to the individual client computer 602a-n in a given instance. In some implementations, the challenge may be based on a hashing algorithm such as the HMAC/SHA-2 algorithm provided in Equation 1, above. The challenge generator 606 may randomly choose a key value r and a message value r', and may then compute an HMAC value h using the key and message values r, r'. The challenge generator 606 may then supplement content from the origin servers 604a-n with challenge code that may run automatically on the client computers 602a-n when the content is loaded by the client computer. The challenge code may cause the client computers 602a-n to iteratively test different message values r' in Equation 1 until a solution is determined. Because the hashing algorithm on which the challenge is based may be substantially non-reversible, it may take time for the client computers 602a-n to solve their respective challenges using the brute-force approach provided in the challenge code, but there may be no ready way to shortcut the brute-force approach. In some implementations, the challenge generator may also include a timestamp t and a signature s with each challenge served to the client computers 602a-n. These parameters may be later used to verify that solutions to legitimate challenges are being submitted, rather than fraudulent challenges that may have been independently generated by untrusted sources, for example. The signature s may be computed according to Equation 2, as described above.

In some implementations, when one of the client computers 602a-n solves a challenge, the solution may be included in a request to initiate a web transaction. Before initiating the web transaction, the request validator 608 may check various aspects of the request to determine whether it is valid. The transactions specified in valid requests may then be performed, while the transactions specified in invalid requests may be denied. The request validator 608 may include several components that each verifies a different aspect of the request, namely a solution validator 610, an anti-manipulation module 612, and an anti-replay module 614. If the components 610-614 verify all aspects of the request, then the request may be deemed valid. In some implementations, if any one of the aspects of the request is not verified, then the request may be deemed invalid.

First, the solution validator 610 is configured to verify that the solution included in a request is an accurate solution to a particular challenge provided to a client computer 602. For example, the solution validator 610 may extract from the request a message value r', which the client computer 602 determined as the solution to the challenge, and the parameters r (key value) and h (HMAC value). The r and h values may be returned in the request, and may have been previously provided to the client computer 602 in the challenge code. The solution validator 610 can then use the r and r' values as input to Equation 1, and can determine whether the resulting HMAC value matches the pre-determined HMAC value h extracted from the request. If the values match, then the solution may be classified as accurate.

Second, the anti-manipulation module 612 can verify that the client computer 602 has submitted a solution to a valid challenge. The validity of a challenge may depend on whether the challenge was generated by a trustworthy source, and whether the challenge was solved in a timely manner. To this end, the client computer 602 may include in the request the timestamp t and signature s. The anti-manipulation module 612 can verify that the signature s is valid by using a secret key k, the pre-determined HMAC value h, and the timestamp t in Equation 2 to re-compute a signature and to determine if it matches the signature s included in the request. A valid signature s indicates that the challenge appears to have been generated by a trusted source, under the assumption that only trusted sources are in possession of the secret key k. Moreover, the timestamp t can be compared to a current time at which the request is being validated. If too much time has elapsed since from the time when the challenge was generated as indicated in timestamp t, then the challenge may be stale. Moreover, the attackers may be prevented from tampering with the timestamp t without affecting validation of the signature s.

In some implementations, the request validator 608 can include a third component as anti-replay module 614. The anti-replay module 614 can verify that solutions to particular challenges are not submitted more than a threshold number of times, as might occur in a replay attack. In some implementations, the threshold number of times may be one, such that a solution to a particular challenge will be only be accepted as valid once. Subsequent attempts by client computers 602 to re-use solutions or re-use challenges may be denied. For example, for hashing challenges based on the HMAC/SHA-2 algorithm of Equation 1, the HMAC value h can uniquely identify a challenge so long as multiple challenges are not served in different instances that yield the same HMAC value. The anti-replay module 614 may thus maintain a log of all the HMAC values h that are submitted in requests from the client computers 602. Each time a new HMAC value h is encountered, it may be added to the log. Thereafter, subsequent requests that include an h value that has already been recorded in the log may be deemed invalid and denied. In some implementations, the h value may be included in the path in a URI of a request, and the computing system 600 may return a cached page for the particular URI rather than checking the log for each request.

In some implementations, the system 600 can further include a transformation module 616. The transformation module 616 can generally be arranged to re-code content served by the origin web servers 604a-n before the content is delivered to the client computers 602. In some implementations, the transformation module may re-code web pages and other types of electronic resources in a manner like the security servers 702a-n depicted in FIG. 7. In some implementations, the transformation module may carry out re-coding operations in a manner like that described in stage 412 of the process 400 of FIG. 4. For example, the transformation module 616 may randomly re-code particular portions of a web page in order to obscure an implicit API and operating characteristics of the web servers 604a-n. The transformations applied by the transformation module 616 may interfere with the ability of attackers to carry out various types of computer attacks via a client computer 602 that has been infected with a malicious bot, for example. In some implementations, the transformations may be made in a manner that does not substantially affect a presentation or functionality of the content from the user's perspective. The transformations may also be changed over time so that resources are re-coded in differently across particular servings of a resource.

FIG. 7 shows a system 700 for serving polymorphic and instrumented code. The system 700 may be adapted to perform deflection and detection of malicious activity with respect to a web server system. The system 700 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 704a-704n, and could include a broad array of web servers, content servers, database servers, financial servers, load balancers, and other necessary components (either as physical or virtual servers).

A set of security server systems 702a to 702n are shown connected between the web servers 704a to 704n and a network 710 such as the internet. Although both extend to n in number, the actual number of sub-systems could vary. For example, certain of the customers could install two separate security server systems to serve all of their web server systems (which could be one or more), such as for redundancy purposes. The particular security server systems 702a-702n may be matched to particular ones of the web server systems 704a-704n, or they may be at separate sites, and all of the web servers for various different customers may be provided with services by a single common set of security servers 702a-702n (e.g., when all of the server systems are at a single co-location facility so that bandwidth issues are minimized).

Each of the security server systems 702a-702n may be arranged and programmed to carry out operations like those discussed above and below and other operations. For example, a policy engine 720 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer.

When such code returns, the policy information may be provided to a de-code, analysis, and re-encode module 724, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their inter-operation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 702a-702n, such as by the security servers 702a-702n implementing a web crawler (not shown) like web crawler 162 in FIG. 1 to recursively search for new and changed content and to report such occurrences to the security servers 702a-702n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 722 may store analytical rules for performing such analysis and for re-encoding of the content. The rules engine 722 may be populated with rules developed through operator observation of particular content types, such as by operators of a system studying typical web pages that call JavaScript content and recognizing that a particular method is frequently used in a particular manner. Such observation may result in the rules engine 722 being programmed to identify the method and calls to the method so that they can all be grouped and re-encoded in a consistent and coordinated manner.

The de-code, analysis, and re-encode module 724 encodes content being passed to client computers from a web server according to relevant policies and rules. The module 724 also reverse encodes requests from the client computers to the relevant web server or servers. For example, a web page may be served with a particular parameter, and may refer to JavaScript that references that same parameter. The de-code, analysis, and re-encode module 724 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and de-codes such strings can be maintained by the security server system 702 along with an identifier for the particular client computer so that the system 702 may know which key or function to apply, and may otherwise maintain a state for the client computer and its session. A stateless approach may also be employed, whereby the system 702 encrypts the state and stores it in a cookie that is saved at the relevant client computer. The client computer may then pass that cookie data back when it passes the information that needs to be de-coded back to its original status. With the cookie data, the system 702 may use a private key to decrypt the state information and use that state information in real-time to de-code the information from the client computer. Such a stateless implementation may create benefits such as less management overhead for the server system 702 (e.g., for tracking state, for storing state, and for performing clean-up of stored state information as sessions time out or otherwise end) and as a result, higher overall throughput.

The de-code, analysis, and re-encode module 724 and the security server system 702 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The de-code, analysis, and re-encode module 724 may be adapted to apply different modifications to each instance of a common web resource, or common portion of a web resource, such that the web code that it is ultimately delivered to the client computers in response to each request for the common web resource includes different modifications.

Such modification may occur according to a process that analyzes the code once for each time it changes in a material way, and then applies the analysis multiple times. For example, elements that can be changed without affecting the presentation of a web page may be located by way of analysis, as may additional instances of those elements through all the code (e.g., HTML, CSS, and JavaScript). A mapping may be made of the types and locations of such elements. Then, each time the code is to be served, the mapping may be used to place random characters or other substitute content in place of each occurrence of each such element. This repeated process may be performed, in certain implementations, with much less computational overhead than would a combined reanalysis and substitution for every serving.

The security server system 702 can apply the modifications in a manner that does not substantially affect a way that the user interacts with the resource, regardless of the different transformations applied, even where different modifications are applied in responding to multiple requests for a common web resource. For example, when two different client computers request a common web page, the security server system 702 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

In some implementations, the decode, analysis, and re-encode module 724 may be configured to generate challenges, insert challenges, and validate solutions to challenges that occur in requests from client computers. For example, the module 724 may determine parameters for an HMAC/SHA-2 hashing challenge, and insert code into content to be served that causes a client to compute a solution to the challenge. The module 724 may include, for example, the challenge generator 606 and request validator 608 from computing system 600 (FIG. 6) in some implementations.

An instrumentation module 726 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other metadata that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 702 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 702, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 704a-704n, as encoded by de-code, analysis, and re-encode module 724, may be rendered on web browsers of various client computers. Uninfected client computers 712a-712n represent computers that do not have malicious code programmed to interfere with a particular site a user visits or to otherwise perform malicious activity. Infected client computers 714a-714n represent computers that do have malware or malicious code (218a-718n, respectively) programmed to interfere with a particular site a user visits or to otherwise perform malicious activity. In certain implementations, the client computers 712, 714 may also store the encrypted cookies discussed above and pass such cookies back through the network 710. The client computers 712, 714 will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 712, 714. For small-scale analysis, each web site operator may be provided with a single security console 707 that provides analytical tools for a single site or group of sites. For example, the console 707 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 707 may also be multiple different consoles used by different employees of an operator of the system 700, and may be used for pre-analysis of web content before it is served, as part of determining how best to apply polymorphic transformations to the web code. For example, in combined manual and automatic analysis like that described above, an operator at console 707 may form or apply rules 722 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 708 may connect to a large number of web content providers, and may be run, for example, by an organization that provides the software for operating the security server systems 702a-702n—an organization separate from the organizations that serve the content. Such console 708 may access complex analytical and data analysis tools, such as tools that identify clustering of abnormal activities across thousands of client computers and sessions, so that an operator of the console 708 can focus on those clusters in order to diagnose them as malicious or benign, and then take steps to thwart any malicious activity.

In certain other implementations, the console 708 may have access to software for analyzing telemetry data received from a very large number of client computers that execute instrumentation code provided by the system 700. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 708 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 700, may be blocked from interaction, or may have their operators notified that their computer is potentially running malicious software (e.g., by sending an e-mail to an account holder of a computer so that the malicious software cannot intercept it easily).

Figure 8:
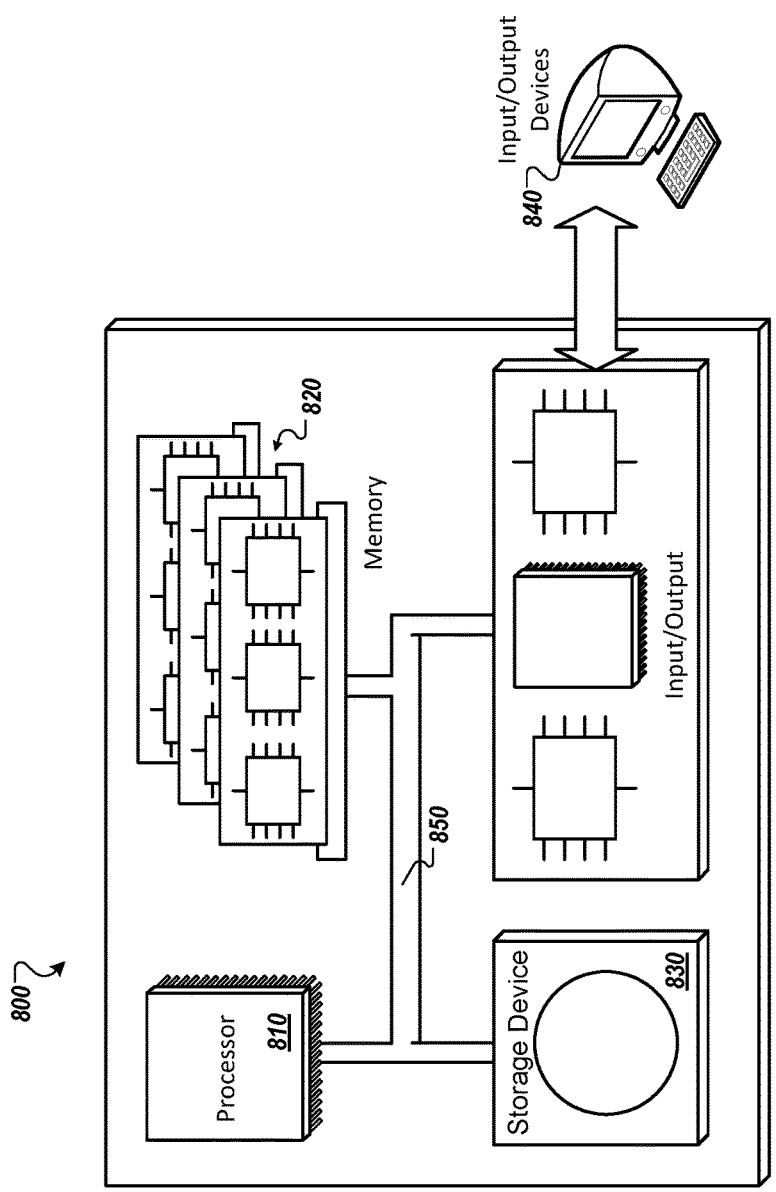
FIG. 8 depicts a schematic diagram of an example computer system that can be used to perform the operations associated with the computer-implemented methods and other techniques described herein.

FIG. 8 is a schematic diagram of a computer system 800. The system 800 can be used to carry out the operations described in association with any of the computer-implemented methods described previously, according to one implementation. The system 800 is intended to include various forms of digital computers, such as laptops, desktops, workstations, personal digital assistants, servers, blade servers, mainframes, and other appropriate computers. The system 800 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 400. In one implementation, the storage device 830 is a computer-readable medium. In various different implementations, the storage device 830 may be a floppy disk device, a hard disk device, an optical disk device, or a tape device.

The input/output device 840 provides input/output operations for the system 400. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, at a computing system, first code corresponding to a web page requested by a client computing device, the first code comprising code that, when executed, allows a user to submit a request to initiate a web transaction presented by the web page;
generating second code that defines a challenge to be solved by the client computing device, the second code comprising code that, when executed, determines a valid solution to the challenge;
generating modified first code corresponding to the web page by embedding the second code into the first code so that the challenge is solved when the modified first code executes, and generating a modified request by modifying the request to require values for one or more parameters that are a solution to the challenge so that submission of any request initiating the web transaction is delayed until the challenge is solved;
providing, to the client computing device, the modified first code;
receiving a modified request from the client computing device to initiate the web transaction, the modified request including a possible solution to the challenge comprising values for the one or more parameters;
determining whether the possible solution is a valid solution to the challenge; and
taking action to initiate the particular web transaction or to not initiate the particular web transaction based on whether the possible solution is a valid solution to the challenge;
wherein the method is performed by one or more computing devices.

2. The computer-implemented method of claim 1, wherein the second code, when executed, determines a valid solution to the challenge by iteratively testing different candidate values in search of values that satisfy one or more constraints associated with the challenge.

3. The computer-implemented method of claim 1, wherein:
the challenge to be solved by the client computing device is to determine a particular message that yields a pre-defined hash value when the particular message is hashed using a particular hash function.

4. The computer-implemented method of claim 1, wherein the second code comprises at least one script that is written in JavaScript that is interpreted and executed at the client computing device.

5. The computer-implemented method of claim 1, wherein, when the modified first code is executed at the client computing device, the client computing device determines a solution to the challenge in the background while a user interacts with the web page after the web page is loaded at the client computing device.

6. The computer-implemented method of claim 1, wherein determining whether the possible solution is a valid solution to the challenge comprises:
identifying a pre-defined output value of a function, the pre-defined output value provided to the client computing device with the second code;
identifying a pre-defined value provided with the second code for a first input parameter to the function;
calculating a second output value of the function using the pre-defined value for the first input parameter and the possible solution included in the request; and
determining whether the pre-defined output value matches the second output value.

7. The computer-implemented method of claim 1, wherein determining whether the possible solution is a valid solution to the challenge comprises verifying that the possible solution was generated by the client computing device within a particular period of time after the second code was provided to the client computing device.

8. The computer-implemented method of claim 1, wherein determining whether the possible solution is a valid solution to the challenge is performed at least in part by one or more computers at an edge of a network, the one or more computers being separate and geographically remote from a web server system from which the first code was originally served.

9. The computer-implemented method of claim 8, further comprising taking action to not initiate the particular web-based transaction, including choosing to not communicate, from the one or more computers at the edge of the network and to the web server system, the request from the client computing device to initiate the web transaction.

10. The computer-implemented method of claim 8, wherein the second code is generated by the web server system or by a proxy computing system that is arranged as a proxy to the web server system.

11. The computer-implemented method of claim 1, wherein the modified first code includes a reference to the second code.

12. The computer-implemented method of claim 1, further comprising, for each of a plurality of instances of the web page to be served to one or more client computing devices, generating code that defines a challenge that is unique to the respective instance of the web page.

13. The computer-implemented method of claim 1, further comprising re-coding the first code so as to obscure an operational design of a computing system that generated the first code, wherein the re-coding does not substantially affect a visual presentation of the web page when the modified first code is executed at the client computing device.

14. The computer-implemented method of claim 1, wherein the web transaction presented by the web page is one of a transaction to modify a listing of items in an online shopping cart, a transaction to create an account, a transaction to login to an account, or a transaction to modify settings associated with an account.

15. The computer-implemented method of claim 1, wherein determining whether the possible solution is a valid solution to the challenge comprises:
parsing the modified request to identify a pre-defined hash value that was provided to the client computing device along with the challenge;
using a pre-defined hash function to compute a second hash value based on the possible solution included in the request; and
determining whether the second hash value matches the pre-defined hash value.

16. The computer-implemented method of claim 1, wherein the possible solution is specified in a universal resource indicator (URI) of the modified request.

17. The computer-implemented method of claim 1, further comprising:
receiving a second request from the client computing device to initiate the web transaction, the second request including a second possible solution to the challenge;
determining whether the second possible solution is a valid solution to the challenge; and
taking action to initiate the particular web-based transaction or not to initiate the second web transaction based on whether the second possible solution is a second valid solution to the challenge.

18. The computer-implemented method of claim 17, wherein determining whether the second possible solution is a valid solution to the challenge comprises:
when the second possible solution is the same as the possible solution, determining that the second possible solution is not valid in response to a determination that the number of times that the possible solution has been received in requests exceeds a replay limit value that identifies a maximum number of times that a solution is permitted to be accepted as a valid solution to the challenge.

19. The computer-implemented method of claim 1, wherein the modified first code does not begin working on the challenge until the user selects a control in the web page that triggers the challenge to be run.

20. A computer system comprising:
one or more hardware processors;
at least one memory coupled to the one or more hardware processors and storing one or more instructions which, when executed by the one or more hardware processors, cause the one or more hardware processors to:
receive, at a computing system, first code corresponding to a web page requested by a client computing device, the first code comprising code that, when executed, allows a user to submit a request to initiate a web transaction presented by the web page;
generate second code that defines a challenge to be solved by the client computing device, the second code comprising code that, when executed, determines a valid solution to the challenge;
generate modified first code corresponding to the web page by embedding the second code into the first code so that the challenge is solved when the modified first code executes, and generating a modified request by modifying the request to require values for one or more parameters that are a solution to the challenge so that submission of any request initiating the web transaction is delayed until the challenge is solved;
provide, to the client computing device, the modified first code;
receive a modified request from the client computing device to initiate the web transaction, the modified request including a possible solution to the challenge comprising values for the one or more parameters;
determine whether the possible solution is a valid solution to the challenge; and
take action to initiate the particular web transaction or to not initiate the particular web transaction based on whether the possible solution is a valid solution to the challenge.

21. The computer system of claim 20, wherein the second code, when executed, determines a valid solution to the challenge by iteratively testing different candidate values in search of values that satisfy one or more constraints associated with the challenge.

22. The computer system of claim 20, wherein:
the challenge to be solved by the client computing device is to determine a particular message that yields a pre-defined hash value when the particular message is hashed using a particular hash function.

23. The computer system of claim 20, wherein the second code comprises at least one script that is written in JavaScript that is interpreted and executed at the client computing device.

24. The computer-implemented method of claim 20, wherein, when the modified first code is executed at the client computing device, the client computing device determines a solution to the challenge in the background while a user interacts with the web page after the web page is loaded at the client computing device.

25. The computer system of claim 20, wherein determining whether the possible solution is a valid solution to the challenge comprises:
identifying a pre-defined output value of a function, the pre-defined output value provided to the client computing device with the second code;
identifying a pre-defined value provided with the second code for a first input parameter to the function;
calculating a second output value of the function using the pre-defined value for the first input parameter and the possible solution included in the request; and
determining whether the pre-defined output value matches the second output value.

26. The computer system of claim 20, wherein the one or more instructions, when executed by the one or more hardware processors, cause the one or more processors to:
receive a second request from the client computing device to initiate the web transaction, the request including a second possible solution to the challenge;
determine whether the second possible solution is a valid solution to the challenge; and take action to initiate the particular web-based transaction or not to initiate the second web transaction based on whether the second possible solution is a second valid solution to the challenge.

27. The computer-implemented method of claim 26, wherein determining whether the second possible solution is a valid solution to the challenge comprises:
when the second possible solution is the same as the possible solution, determining that the second possible solution is not valid in response to a determination that the number of times that the possible solution has been received in requests exceeds a replay limit value that identifies a maximum number of times that a solution is permitted to be accepted as a valid solution to the challenge.

28. The computer system of claim 20, wherein determining whether the possible solution is a valid solution to the challenge comprises verifying that the possible solution was generated by the client computing device within a particular period of time after the second code was provided to the client computing device.

29. The computer system of claim 20, wherein the step of determining whether the possible solution is a valid solution to the challenge is performed at least in part by one or more computers at an edge of a network, the one or more computers being separate and geographically remote from a web server system from which the first code was originally served.

30. The computer-implemented method of claim 29, wherein the one or more instructions, when executed by the one or more hardware processors, cause the one or more processors to:
take action to not initiate the particular web-based transaction, including choosing to not communicate, from the one or more computers at the edge of the network and to the web server system, the request from the client computing device to initiate the web transaction.

31. The computer-implemented method of claim 29, wherein the second code is generated by the web server system or by a proxy computing system that is arranged as a proxy to the web server system.

32. The computer system of claim 20, wherein the modified first code includes a reference to the second code.

33. The computer system of claim 20, wherein the one or more instructions, when executed by the one or more hardware processors, cause the one or more processors to:
for each of a plurality of instances of the web page to be served to one or more client computing devices, generate code that defines a challenge that is unique to the respective instance of the web page.

34. The computer system of claim 20, wherein the one or more instructions, when executed by the one or more hardware processors, cause the one or more processors to:
re-code the first code so as to obscure an operational design of a computing system that generated the first code, wherein the re-coding does not substantially affect a visual presentation of the web page when the web page is executed at the client computing device.

35. The computer system of claim 20, wherein the web transaction presented by the web page is one of a transaction to modify a listing of items in an online shopping cart, a transaction to create an account, a transaction to login to an account, or a transaction to modify settings associated with an account.

36. The computer system of claim 20, wherein determining whether the possible solution is a valid solution to the challenge comprises:
parsing the modified request to identify a pre-defined hash value that was provided to the client computing device along with the challenge;
using a pre-defined hash function to compute a second hash value based on the possible solution included in the request; and
determining whether the second hash value matches the pre-defined hash value.

37. The computer system of claim 20, wherein the possible solution is specified in a universal resource indicator (URI) of the modified request.

38. The computer system of claim 20, wherein the modified first code does not begin working on the challenge until the user selects a control in the web page that triggers the challenge to be run.

* * * * *